United States Patent [19]

Hirawa et al.

[11] Patent Number: 4,951,228

[45] Date of Patent: Aug. 21, 1990

[54] METHOD OF GENERATING RASTER DATA USEFUL IN REPRODUCING A MULTITONE IMAGE

[75] Inventors: Takahide Hirawa; Hitoshi Matsuda; Akira Hikita; Yoshikazu Kago, all of Kyoto, Japan

[73] Assignee: Dainippon Screen Mfg. Co., Ltd., Japan

[21] Appl. No.: 337,572

[22] Filed: Apr. 13, 1989

[30] Foreign Application Priority Data

Apr. 28, 1988 [JP] Japan ................................ 63-106759

[51] Int. Cl.$^5$ ................................ G06F 3/12
[52] U.S. Cl. ................................ 364/520; 340/734; 340/729
[58] Field of Search ............... 364/518, 520, 521, 522; 358/903, 485; 340/721, 729, 739, 742, 728; 101/450.1, 211

[56] References Cited

U.S. PATENT DOCUMENTS

| | | | |
|---|---|---|---|
| 4,300,206 | 11/1981 | Belleson et al. | 364/900 |
| 4,594,673 | 6/1986 | Holly | 340/734 X |
| 4,791,582 | 12/1988 | Ueda et al. | 364/518 X |
| 4,823,282 | 4/1989 | Yamagami | 340/734 X |
| 4,868,552 | 9/1989 | Chang | 340/734 X |

Primary Examiner—David L. Clark
Attorney, Agent, or Firm—Ostrolenk, Faber, Gerb & Soffen

[57] ABSTRACT

A priority grade is provided to each of several graphic figures. Respective contour lines of the graphic figures are classified into two groups according to respective locations. Respective contour lines in the two groups are serially selected in a descending order of main scanning coordinate values, and are compared with each other to specify a cross point having the largest coordinate value within a selected pair of cross points. A component of the raster data is generated on the basis of the selected cross point when a priority grade of the selected cross point satisfies a predetermined condition in connection with respective priority grades of the other cross points.

13 Claims, 17 Drawing Sheets

FIG. 15

| t | RG $P_{MAX}$ | COUNTER 106 $P_1$ | $P_2$ | $P_3$ | $P_4$ | $P_5$ | STACK 105 | M | RESULT D |
|---|---|---|---|---|---|---|---|---|---|
| $t_0$ | −1 | 0 | 0 | 0 | 0 | 0 | | 0 | $(Y_0 T_0)$ |
| $t_1$ | 1 | 1 | 0 | 0 | 0 | 0 | $T_1 P_1$ | 1 | $Y_{1s} T_1$ |
| $t_2$ | 3 | 1 | 0 | 1 | 0 | 0 | $T_4 P_3$ | 2 | $Y_{4s} T_4$ |
| $t_3$ | 3 | 1 | 1 | 1 | 0 | 0 | $T_3 P_2$ | 3 | |
| $t_4$ | 4 | 1 | 1 | 1 | 1 | 0 | $T_6 P_4$ | 4 | $Y_{6s} T_6$ |
| $t_5$ | 4 | 1 | 1 | 0 | 1 | 0 | X | 3 | |
| $t_6$ | 5 | 1 | 1 | 0 | 1 | 1 | $T_8 P_5$ | 4 | $Y_{8s} T_8$ |
| $t_7$ | 5 | 0 | 1 | 0 | 1 | 1 | X | 3 | |
| $t_8$ | 5 | 0 | 1 | 0 | 0 | 1 | X | 2 | |
| $t_9$ | 2 | 0 | 1 | 0 | 0 | 0 | X | 1 | $Y_{8e} T_3$ |
| $t_{10}$ | 2 | 1 | 1 | 0 | 0 | 0 | $T_2 P_1$ | 2 | |
| $t_{11}$ | 4 | 1 | 1 | 0 | 1 | 0 | $T_7 P_4$ | 3 | $Y_{7s} T_7$ |
| $t_{12}$ | 4 | 1 | 1 | 1 | 1 | 0 | $T_5 P_3$ | 4 | |
| $t_{13}$ | 4 | 1 | 1 | 0 | 1 | 0 | X | 3 | |
| $t_{14}$ | 2 | 1 | 1 | 0 | 0 | 0 | X | 2 | $Y_{7e} T_3$ |
| $t_{15}$ | 1 | 1 | 0 | 0 | 0 | 0 | X | 1 | $Y_{3e} T_2$ |
| $t_{16}$ | −1 | 0 | 0 | 0 | 0 | 0 | X | 0 | $Y_{2e}(T_0)$ |

FIG. 17
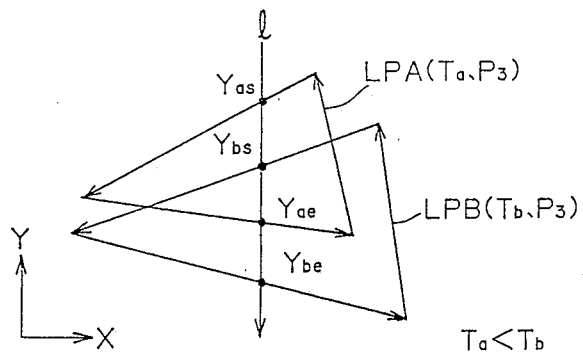
FIG. 18
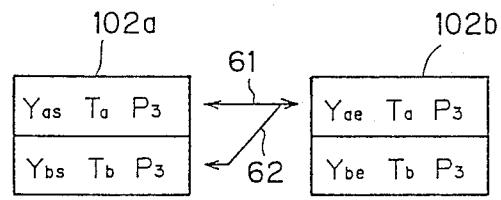
FIG. 19
| t | RG | COUNTER 106 | | | STACK 105 | | M | RESULT (D) |
|---|---|---|---|---|---|---|---|---|
| | $P_{MAX}$ | ... | $P_3$ | ... | | | | |
| $t_0$ | −1 | ... | 0 | ... | | | 0 | |
| $t_1$ | 3 | ... | 1 | ... | $T_a P_3$ | | 1 | $Y_{as}\ T_a$ |
| $t_2$ | 3 | ... | 2 | ... | ↓ | $T_b P_3$ | 2 | $Y_{bs}\ T_b$ |
| $t_3$ | 3 | ... | 1 | ... | X | ↓ | 1 | |
| $t_4$ | −1 | ... | 0 | ... | | X | 0 | $Y_{be}(T_0)$ |

METHOD OF GENERATING RASTER DATA USEFUL IN REPRODUCING A MULTITONE IMAGE

BACKGROUND OF THE INVENTION

1. Field of the Invention

The present invention relates to a method of generating raster data on the basis of respective contour vectors of graphic figures. The raster data is useful to produce a multitone image containing the graphic figures through a raster scan of an image plane for each scanning line, where the term "graphic figures" expresses character fonts, geometric figures and other graphic information that may be represented on a plane.

2. Description of the Background Art

In the field of commercial printing and the like, techniques for automatically reproducing an image containing a plurality of graphic figures through a raster scan have been developed. In one of the techniques, raster data for generating run-length codes are obtained by finding intercrossing points of scanning lines and contours of the graphic figures and then sorting and merging the intercrossing points according to respective main scanning condinates thereof.

However, the prior art can be applied only to binary images, and no techniques have been proposed for systematically generating raster data in order to reproduce a multitone image. Therefore, when it is required to reproduce a multitone image through a raster scan, an original image is produced through manual operation, and image data of a photosensitive material for the raster scan is generated by reading the original image with a photoelectric image reader. Such a manual operation is laborious, and requires much time to obtain desired raster data.

SUMMARY OF THE INVENTION

The present invention is intended for a method of generating a raster data that is used for producing a multitone image having graphic figures, through the use of a raster scan of an imaging plane for each scanning line.

According to the present invention, the method comprises the steps of: (A1) preparing sets of contour lines which express contours of the graphic figures, respectively; (A2) determining an imaging condition and a priority grade of each graphic figure for production of the multitone image; (A3) generating attributive data expressing the imaging condition and the priority grade for each graphic figures; and (A4) relating the attributive data to each contour line belonging to the sets of contour lines for each graphic figure.

In the next step (A5), the contour lines belonging to the sets of contour lines are classified into first and second groups according to respective locations of the contour lines in the contours, where the first group consists of first contour lines which face an upstream side of a main scanning in the raster scan, and the second group consists of second contour lines which face a downstream side of the main scanning.

First cross points of the first contour lines and a scanning line are obtained in a step (A6). Generated for each first cross point in a step (A7) is first cross point data which includes a main scanning coordinate value of the first cross point and the attributive data related to a contour line from which the first cross point belongs.

Similarly, in the step (A8), second cross points of the second contour lines and the scanning line are obtained, and in a step (A9), generated for each second cross point is second cross point data which includes a main scanning coordinate value of the second cross point and the attributive data related to a contour line from high the second cross point belongs.

Respective, main-scanning coordinate values of the first cross points are compared with each other to serially extract a first object point from the first cross points along an order from the upstream side to the downstream side, in a step (A10). Similarly, respective main scanning coordinate values of the second cross points are compared with each other to serially extract a second object point from the second cross points along the order, in a step (A11).

Then, in step (A12), respective main scanning coordinate values of the first and second object points are comapred with each other to specify a cross point which is located at a position nearer to the upstream side within the first and second object points.

In step (A13), one of the following steps (A13a) and (A13b) is conducted.

That is, when a specified cross point that is specified in the step (A12) is the first object point, the attributive data of the first object point is registered in a first memory in step (A13a) when the specified cross point is the second object point, an attributive data which is identical to the attributive data of the second object point is deleted from the first memory in step (A13b).

The method further comprises the steps of (A14) detecting a change of a maximum priority grade within attributive data which are currently registered in the first memory where the change is caused by the step (A13); (A15) in response to the change of the maximum priority grade, finding attributive data in the first memory to which a changed maximum priority grade belongs; (A16) generating a component of the raster data on the basis of the imaging condition belonging to the attributive data which is found in the step (A15) and the main scanning coordinate value of the specified cross point; (A17) repeating the steps (A11) through (A16) until all of the first and second cross points are extracted in the step (A11) to generate components of the raster data for the scanning line; and (A18) repeating the steps (A6) through (A17) for each scanning line arrayed in subscanning direction to generate the raster data.

In the present invention, the term "multitone" indicates the condition where a plurality of imaging tones, e.g., halftone dot percentages in a halftone dot image, black/white levels in a binary image and other imaging levels which can be discriminated from each other, may be included in an image. In particular, the present invention is quite effective for a multitone image which has three or more tones.

According to the present invention, overlapped graphic figures can be imaged in an arbitrary order in spatial priority since a priority grade is provided for each graphic figure. The attributive data including the priority grade is provided for the cross point data expressing respective cross points of the contour lines and each scanning line. A cross point having a higher priority is used for generating the raster data spatially prior to another cross point having a lower priority, and therefore, the graphic figures are overlapped in a desired order of spatial priority.

Preferably, a combination of the steps (A6) and (A7) is conducted in parallel with a combination of the steps (A8) and (A9). In an aspect of the present invention, the step (A10) includes the steps of: (A101) sorting respective first cross point data for the first cross points according to respective main scanning coordinate values in the first cross point data to store sorted first cross point data in a second memory; and (A102) serially reading out the sorted first cross point data from the second memory in an order along the scanning line to serially provide the first object point.

Similarly, the step (A11) includes the steps of: (A111) sorting respective second cross point data for the second cross points according to respective main scanning coordinate values in the second cross point data to store sorted second cross point data in a third memory; and (A112) serially reading out the sorted second cross point data from the third memory in an order along the scanning line to serially provide the second object point.

The same priority grade may be commonly assigned to two or more graphic figures.

Accordingly, an object of the present invention is to systematically generate raster data that is used for producing a multitone image having plurality of graphic figures.

Another object of the present invention is to generate raster data at high speed.

These and other objects, features, aspects and advantages of the present invention will become more apparent from the following detailed description of the present invention hen taken in conjunction with the accompanying drawings.

BRIEF DESCRIPTION OF THE DRAWINGS

FIGS. 15 and 16 are diagrams showing processings of respective data in the preferred embodiment, and FIGS. 17-19 are diagrams showing an example of an intra-layer processing.

DESCRIPTION OF THE PREFERRED EMBODIMENTS

A. Process of Generating Graphic Data

Figure 1A:
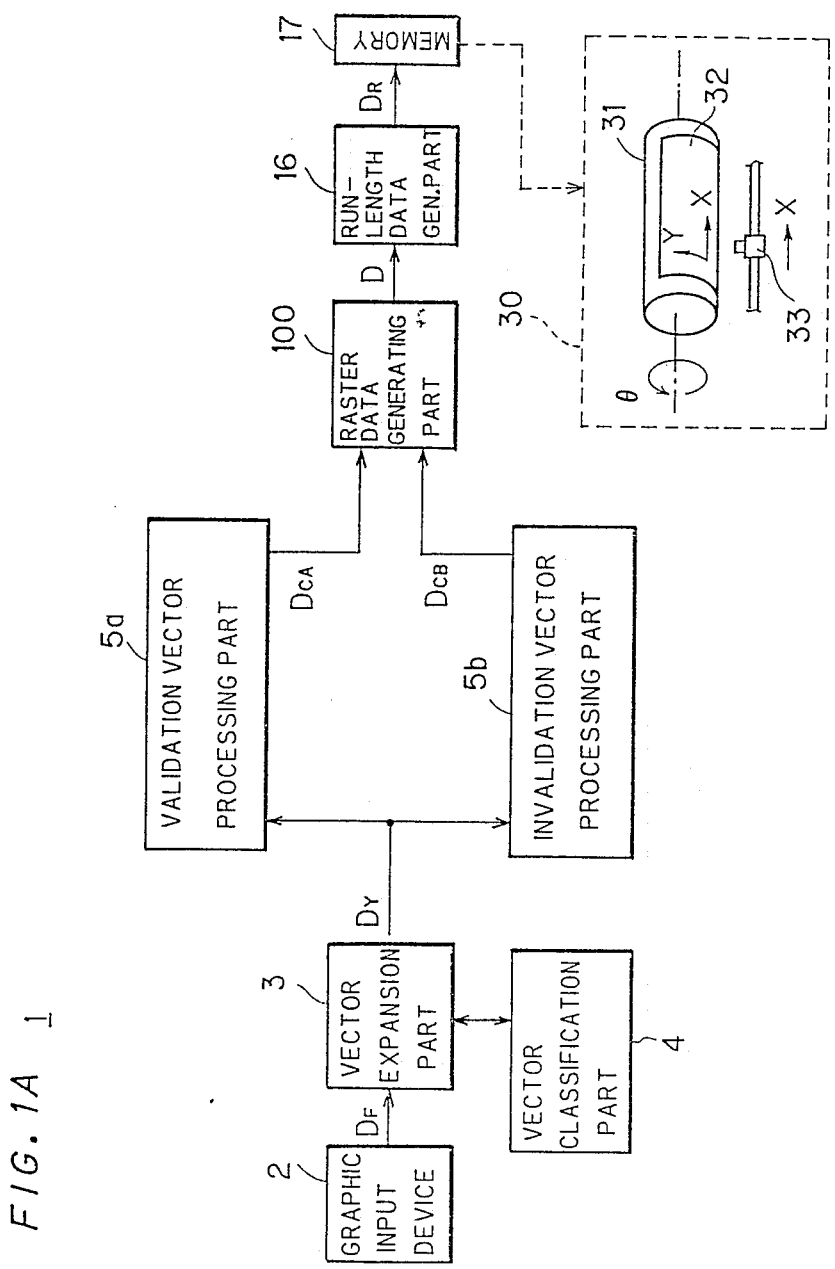
FIG. 1A is a block diagram of a raster data generator operable to generate raster data according to a preferred embodiment of the present invention.
Figure 2:
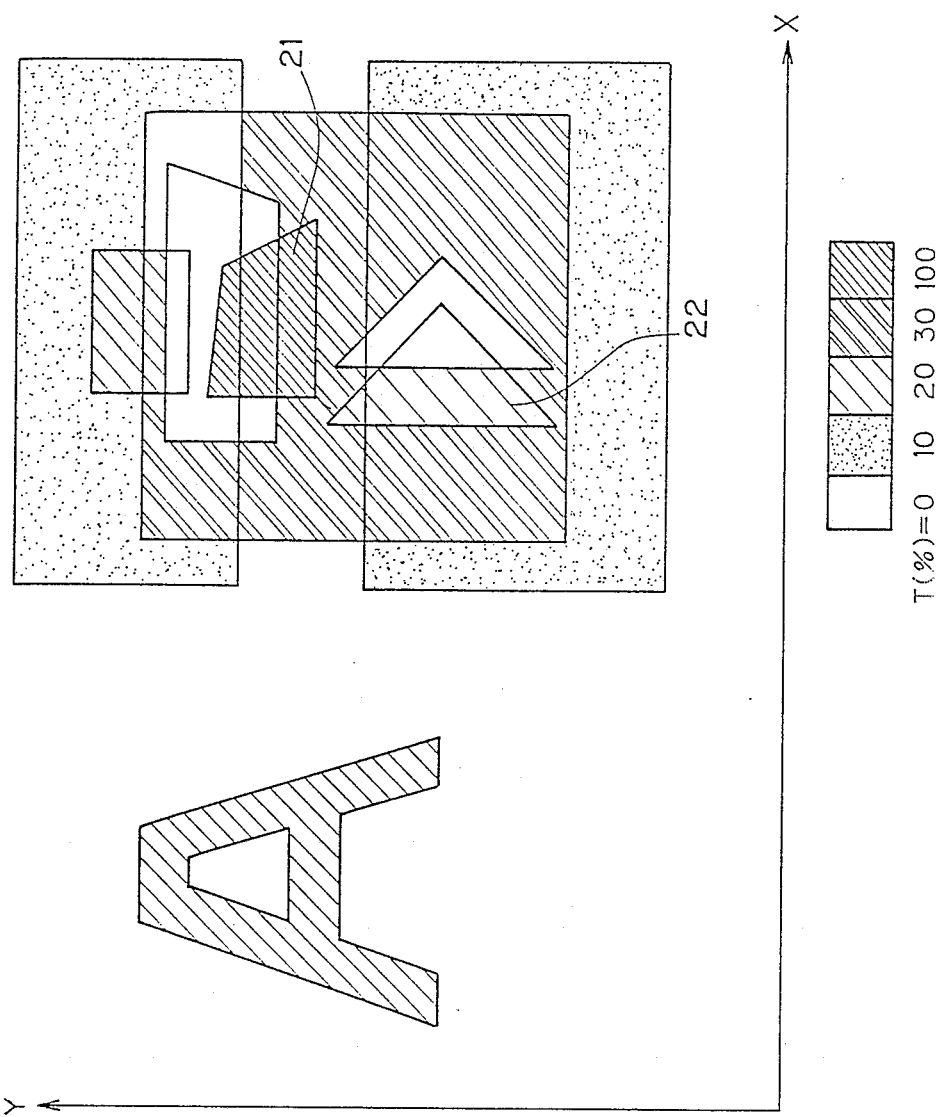
FIG. 2 shows an example of a multitone image having a plurality of graphic images.

FIG. 1A is a schematic block diagram showing a raster data generator according to a preferred embodiment of the present invention, where bus lines are expressed by single lines. The following description will be directed to an example for generating raster data usable to reproduce the multitone image shown in FIG. 2 through raster scan of a photosensitive film. Slant lines, sand dots and other patterns filling the regions in FIG. 2 represent respective halftone dot percentages T in halftone dot recording as shown in the foot margin of FIG. 2. Furthermore, the symbols X and Y represent main scanning and subscanning coordinate axes, respectively.

Figure 1B:
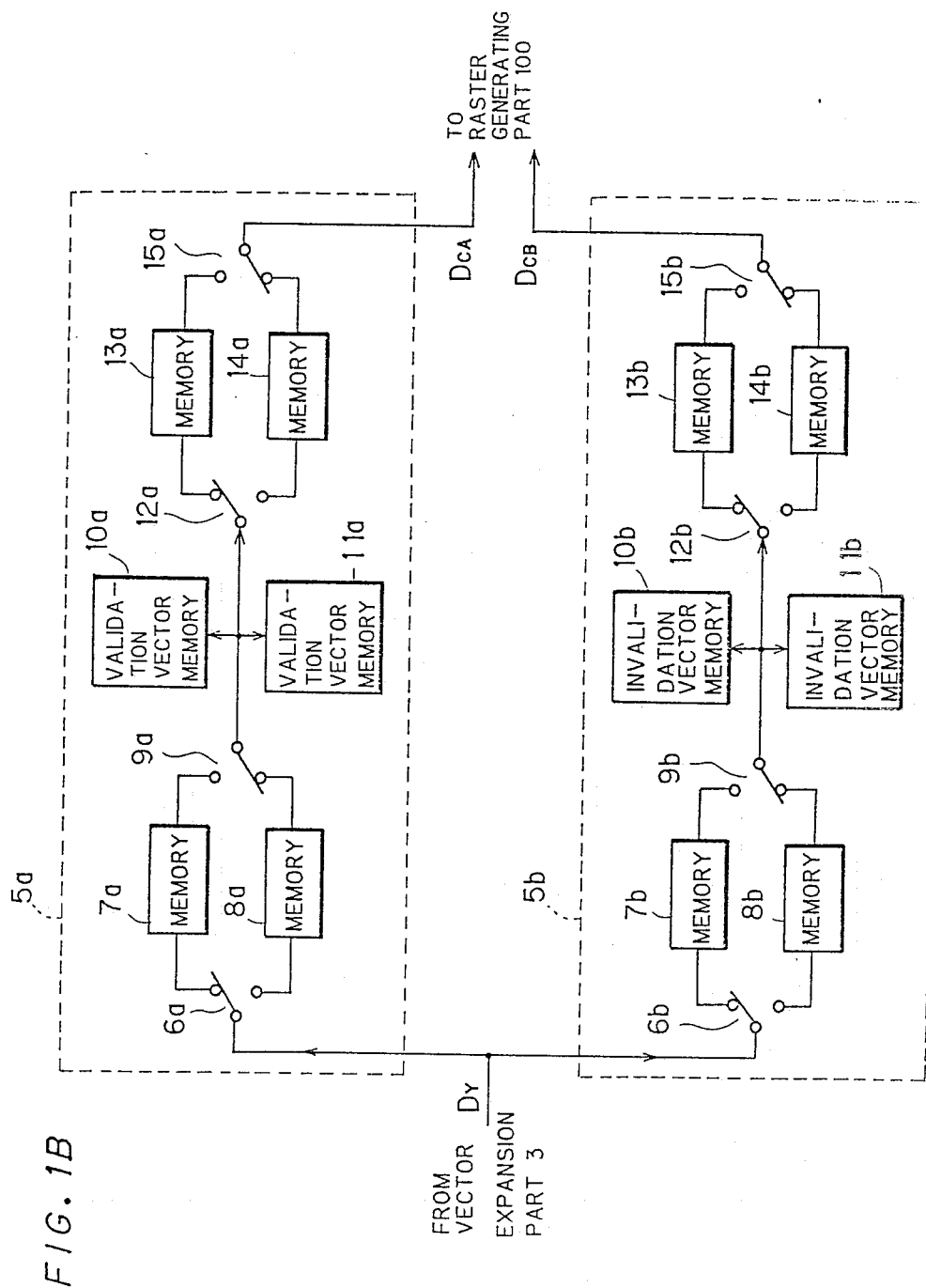
FIG. 1B is a block diagram showing vector processing parts 5a and 5b included in the raster data generator of FIG. 1A.
Figures 3A, 3B, 3C, 3D:
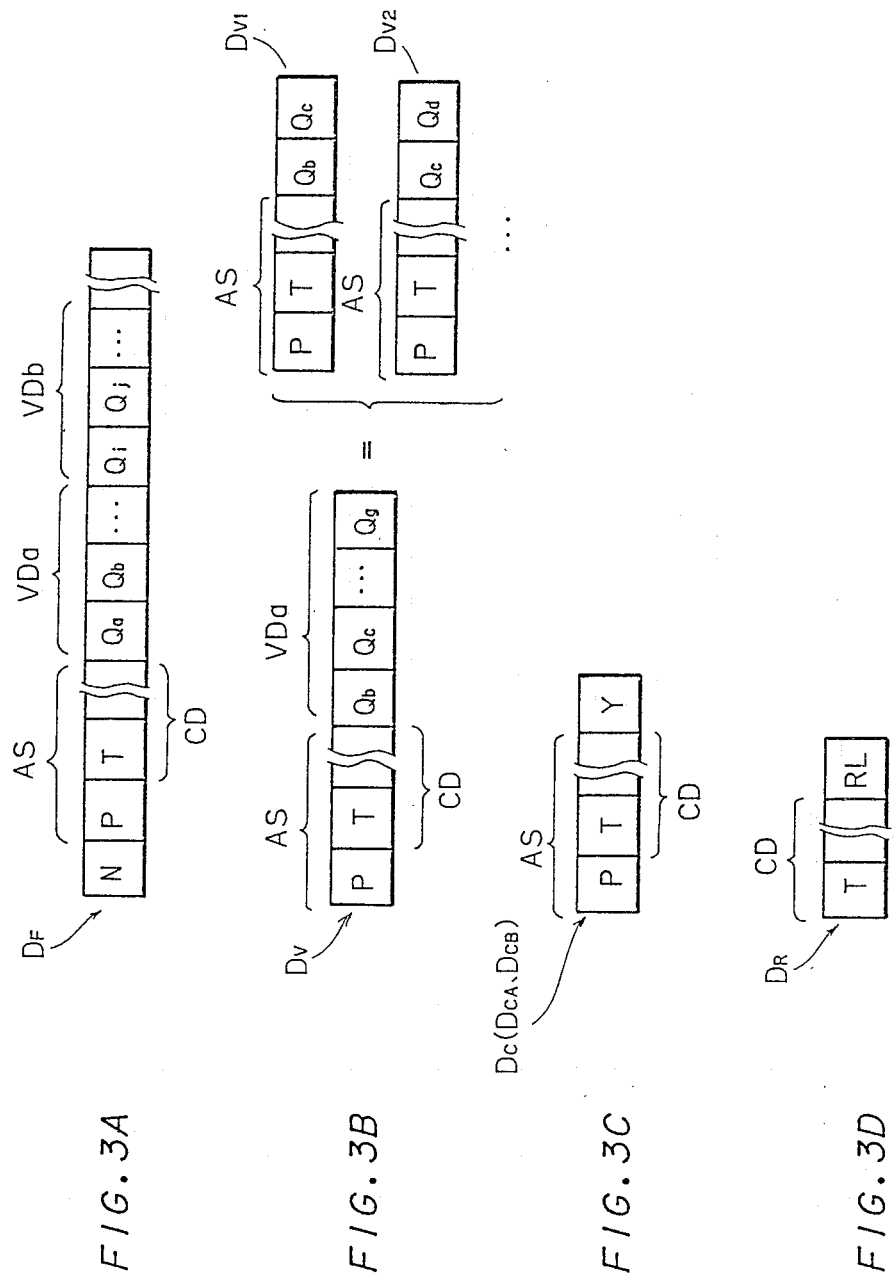
FIGS. 3A-3D show examples of data formats used in the preferred embodiments.

Referring to FIGS. 1A-1B, the raster data generator comprises a graphic input device 2 including a digitizer. Through input operation of the graphic input device 2, graphic data $D_F$ having the data format of FIG. 3A is generated in the graphic input device 2 for each graphic figure. With respect to the character "A" shown in FIG. 2, for example, the graphic data $D_F$ has the following information:

(a) The number N of contour lines (i.e., closed loops $LP_a$ and $LP_b$ shown in FIG. 4) forming the character "A", (b) Data $VD_a$ and $VD_b$ expressing respective positions and shapes of the closed loops $LP_a$ and $LP_b$, and (c) Attributive data AS which expresses imaging attribution of the graphic figure "A".

Figure 4:
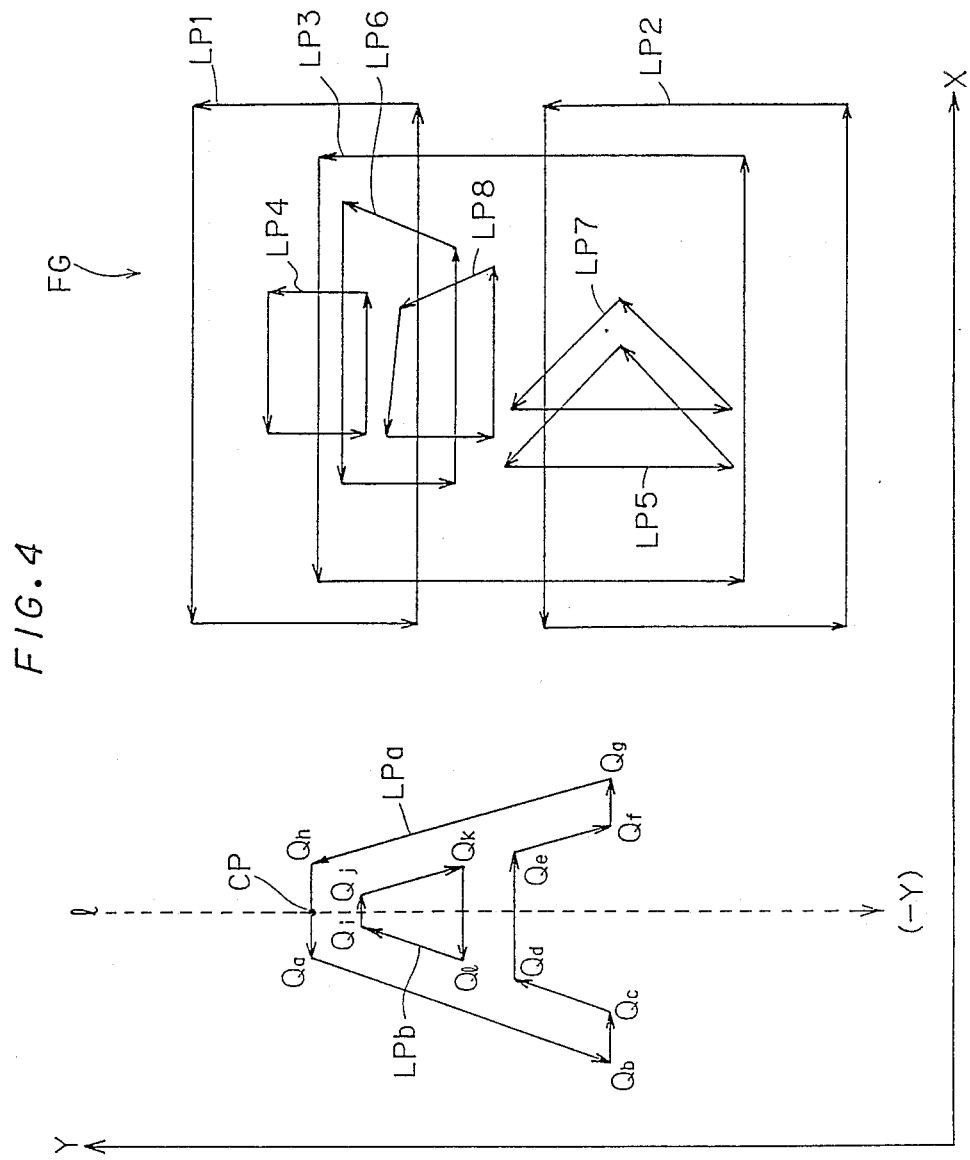
FIG. 4 is an explanatory diagram showing contour vectors.

Within these data, the closed loop data $VD_a$ and $VD_b$ include a sequence of respective twO-dimensional coordinates of the points $Q_a, Q_b, \ldots Q_i, Q_j, \ldots$, which are respective apexes of polygons expressing the closed loops $LP_a$ and $LP_b$. The order in the sequence indicates the respective directions of contour vector $\overrightarrow{Q_aQ_b}, \overrightarrow{Q_bQ_c}, \ldots$, which are so determined that the respective left sides and right sides of the contour vectors correspond to filling and unfilling regions, respectively, when the contour vectors are observed from the start points to the end points thereof. This situation is understood more clearly when FIG. 4 is compared with FIG. 2. In other word, contours whose inner region should be filled with colors or tints are expressed by a counterclockwise loop of vectors, while contours whose inner region should be unfilled are expressed by a clockwise loop of vectors.

The attributive data AS has imaging priority data P and imaging condition data CD having multi-levels. The imaging condition data CD indicates an imaging condition under which the inner or outer region of the graphic figure is imaged or reproduced, and in the preferred embodiment, a halftone dot condition data or a halftone dot percentage T is included in the imaging condition data CD. The halftone dot condition data T may selectively indicate not only 0% and 100% but also other percentages between 0% and 100% , and therefore, the halftone dot condition data are "multi-level data" for selecting one halftone level. For example, when it is desired to fill the character "A" shown in FIG. 2 with a tint of 20% , the value of T=20% is designated in the imaging condition data CD. The imaging condition data CD may include information for designating a gradation rate, a color and other characteristics of the graphic image. The first broken part of FIG. 3A shows a possibility that such additional information is included in the imaging condition data CD.

On the other hand, the imaging priority data P indicate a spatial priority grade in which a corresponding graphic figure is imaged when the graphic figure is overlapped with another graphic figure in a multitone image. The reason why the priority grade is introduced into multitone imaging is as follows:

Referring to FIG. 4 corresponding to FIG. 2, it is supposed that a figure group FG has eight graphic figures which are formed by closed loops LP1 through LP8, respectively. As will be understood by comparing FIG. 4 with FIG. 2, a desired image of FIG. 2 cannot be obtained if the image is reproduced under the rule where graphic figures are overlapped according to one of the ascending and descending orders in the respective halftone percentages thereof. For example, a graphic figure having a larger halftone dot percentage should be imaged at a high priority in a region 21 of FIG. 2, while a graphic figure having a smaller halftone dot percentage should be imaged at a high priority in a region 22.

Under the circumstances, the raster data generator 1 according to the preferred embodiment is so constructed that respective priority grades of graphic figures in image reproduction can be arbitrarily designated regardless of respective halftone dot percentages of the graphic figures, and imaging priority data P indicating the priority grade is given to the graphic data $D_F$. The designation of the priority grades may be attained by assigning the priority numerals "1", "2", ..., "$N_{TOT}$" to the graphic figures in one-to-one correspondence, where the integer $N_{TOT}$ indicates the total number of graphic figures. However, it is a rare case that all of the $N_{TOT}$ graphic figures overlap each other in the same region, and in practice, the number of graphic figures overlapping in a same region is relatively small even if the number $N_{TOT}$ is large. Therefore, it may be sufficient for image reproduction that the upper limit $N_{LIM}$ of the number of overlapping graphic figures is previously assumed, and that all of the graphic figures are classified into $N_{LIM}$ groups according to relative priority grades or ranks of the graphic figures.

Figure 6:
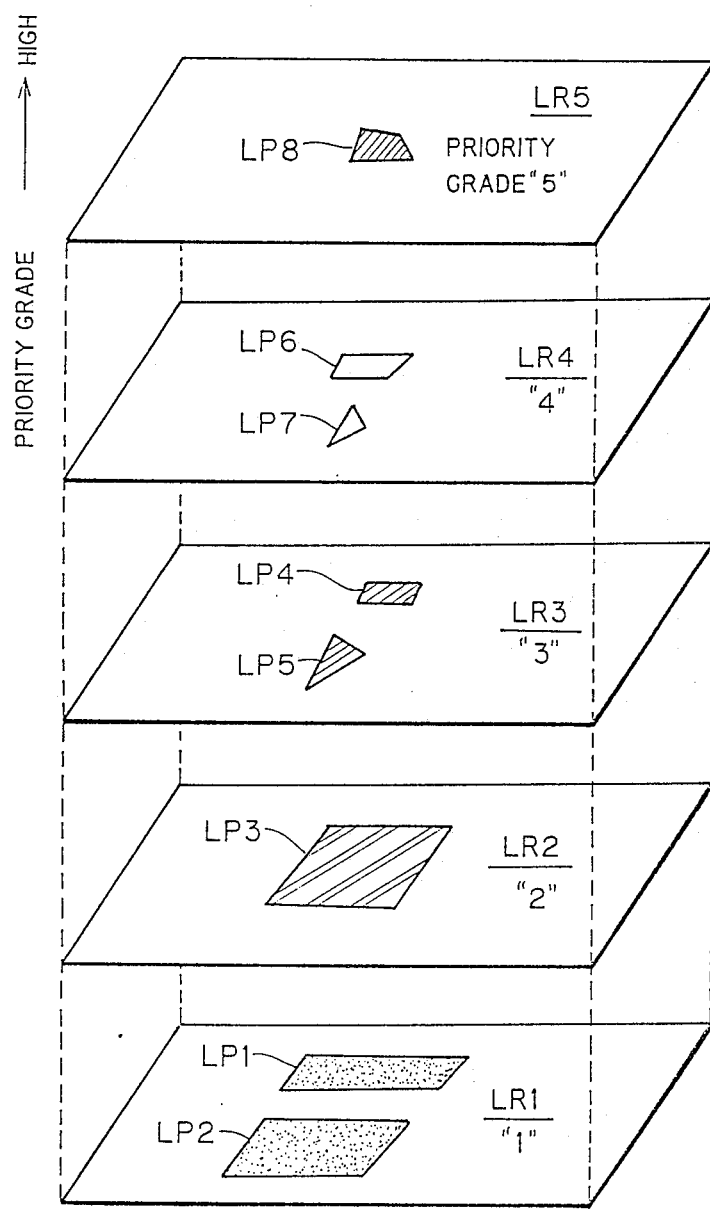

In accordance with the latter principle, the upper limit $N_{LIM}$ is assumed to be "5" in the preferred embodiments, and each of the graphic figures LP1 through LP8 is provided with one of the priority grades "1" through "5", where the graphic figures LP1 through LP8 are defined as graphic figures which are formed by the closed loops LP1 through LP8, respectively. In other words, imaginary five priority layers LR1 through LR5 corresponding to the priority grades "1" through "5" are assumed as shown in FIG. 6, and each of the graphic figures LP1 through LP8 is assigned to one of the layers LR1 through LR5. When the priority grades "1" through "5" are so defined that a higher priority grade corresponds to a larger number, i.e., the highest priority grade is "5", the graphic figures shown in FIG. 6 are reproduced according to a spatial priority order from the top layer LR5 to the bottom layer LR1.

Figure 5:
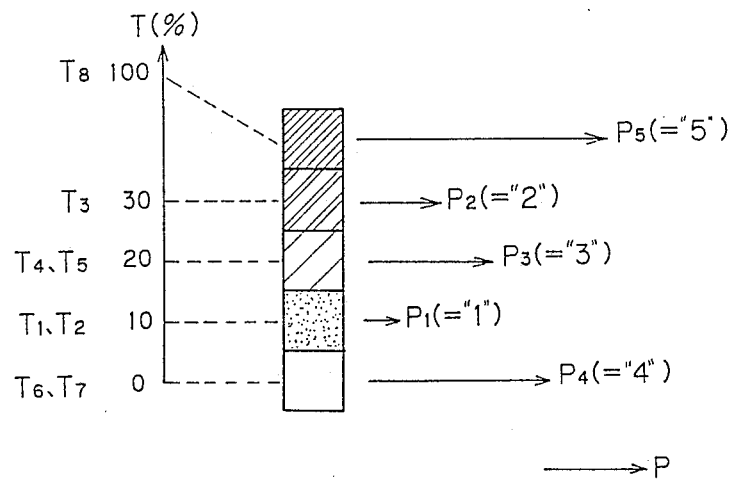
FIG. 5 and FIG. 6 are explanatory diagrams which schematically show imaging-priority grades.

As will be understood from FIG. 6, the priority grades can be assigned to the graphic figures LP1 through LP8 regardless of the halftone dot percentages of the graphic figures LP1 through LP8. For example, although the halftone dot percentage 20% is designated for the graphic figures LP4 and LP5 as shown in FIG. 5, the graphic figures LP4 and LP5 have a priority grade higher than that for the graphic figure LP3 to which a halftone dot percentage 50% is designated. The highest priority grade is given to the graphic figure LP8 to which a halftone dot percentage 100% is designated.

In FIG. 6, the graphic figures having the same halftone dot percentage are assigned to the same layer, for convenience of explanation. However, a plurality of graphic figures having different halftone dot percentages may belong to the same layer. In such a case, the plurality of graphic figures belonging to the same layer are reproduced according to a predetermined rule; for example, that a graphic figure having a larger halftone dot percentage is reproduced at a higher priority than that of another graphic figure having a smaller halftone dot percentage within the same layer. An example of a process according to the rule will be described layer. One of the priority grades "1" through "5" are also assigned to the character "A" shown in FIG. 2 for designating relative priority between the character "A" and the other graphic figures LP1 through LP8, although it is not illustrated in FIG. 6.

B. Expansion of Graphic Data and Classification Thereof

The graphic data $D_F$ having the above-indicated components is transmitted to a vector expansion part 3 shown in FIG. 1 to be expanded into contour vectors. For example, the closed loop $LP_a$ (FIG. 4) which is included in the character "A" is expanded into vectors $\overrightarrow{Q_a Q_b}$, $\overrightarrow{Q_b Q_c}$, ..., $\overrightarrow{Q_h Q_a}$. Each vector data expressing these vectors is an "enriched vector data" which has not only respective two-dimensional coordinates of terminal points (i.e., start and end points) of a corresponding vector but also the attributive data AS obtained from the original graphic data.

The enriched vector data may be a vector data $D_{V1}$ or $D_{V2}$ shown in FIG. 3B which is provided for each vector. However, the enriched vector data in the preferred embodiment is constructed in the form of a data $D_V$ shown in FIG. 3B, which has a data format different from the data $D_{V1}$ and $D_{V2}$. Such an improvement is introduced in connection with a classification process through which the enriched vector data are classified into two types. Details of the classification process are as follows:

First, it is to be noted that the direction of each contour vector indicates whether the contour vector exists on the front edge or the rear edge of the graphic figure to which the contour vector belongs, where the front edge and the rear edge are defined in connection with the direction ($-Y$) of a main scanning for the image reproduction. In other words, edges facing the upstream side of the main scanning are front edges, while those facing the downstream side of the main scanning are rear edges. For example, the leftward contour vectors $\overrightarrow{Q_h Q_a}$ and $\overrightarrow{Q_k Q_l}$ are "front edge vectors" existing on the front edges of the graphic figure or the character "A", while the rightward contour vectors $\overrightarrow{Q_i Q_j}$ and $\overrightarrow{Q_d Q_c}$ are "rear edge vector" existing on the rear edges of the same. Therefore, the respective directions of the contour vectors are indexes of the contour vectors by which the front edge vectors and the rear edge vectors are discriminated from each other.

Since main scanning is carried out along the direction ($-Y$), the imaging condition for a graphic figure should be validated when the main scanning reaches a front edge vector while it should be invalidated when the main scanning reaches a rear edge vector. Accordingly, the two types of the contour vectors, i.e., the front edge vectors and the rear edge vectors, have opposite characters with respect to the main scanning, and it is prefered to individually process the two types of the contour vectors.

Under the circumstances, the respective enriched vector data are classified into front edge vector data expressing the front edge vectors and rear edge vector data expressing the rear edge vectors, in the preferred embodiment. The two types of contour vectors may be also discriminated from each other according to the criterion whether a region on which an imaging condition should be validated exists or does not exist just under the contour vector when the main scanning is progressed along the downward direction ($-Y$), as shown in FIG. 4 with a dotted line. Consequently, the front edge vectors and the rear edge vectors are hereinafter referred to as "validation vectors" and "invalidation vectors", respectively. Similarly, the front edge vector data and the rear edge vector data are referred to as "validation vector data" and "invalidation vector data", respectively.

Figure 7:
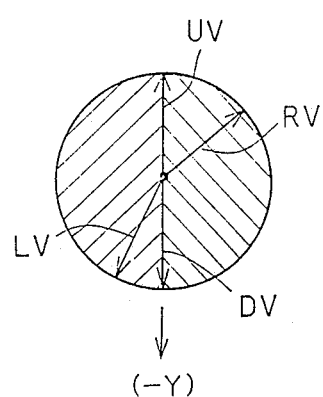
FIG. 7 is an explanatory diagram showing a criterion for classifying contour vectors into validation vectors and invalidation vectors.

The classification of the enriched vector data into validation vector data and invalidation vector data is attained by detecting respective directions of the contour vectors. More particularly, in FIG. 7, when the main scanning direction ($-Y$) is in the downward direction, it is detected whether each of the contour vectors is in a rightward vector RV having a component in the rightward direction or a leftward vector LV having a component in the leftward direction. A contour vector is an invalidation vector if the contour vector is a rightward vector RV, while it is a validation vector if it is a leftward vector. Although upward vectors UV and downward vectors DV may be also taken into consideration, they are ignored in the preferred embodiment, since a graphic figure can be reproduced as long as the leftward vectors LV and the rightward vectors RV are provided.

Figure 8:
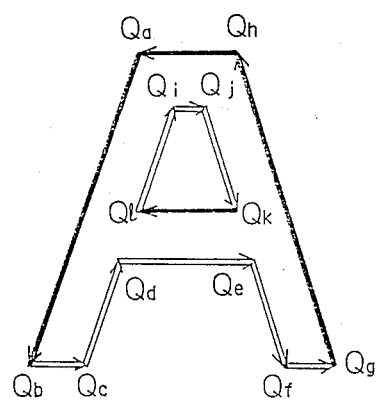
FIG. 8 is an explanatory diagram showing validation vectors and invalidation vectors in the character "A"

Through the classification process, the respective contour vectors forming the character "A" shown in FIG. 4, for example, are classified into validation vectors illustrated as black vectors shown in FIG. 8 and as invalidation vectors illustrated as white vectors. As will be understood from the example shown in FIG. 8, a number of validation vectors often forms a continuous chain, and similarly, a chain of invalidation vectors is often found in a graphic figure. Consequently, contour vectors are traced along each of the closed loops $LP_a$ and $LP_b$ (FIG. 4). The validation vectors and the invalidation vectors forming respective chains are collected for each chain, whereby respective data expressing the chains are generated. The enriched vector data $D_V$ shown in FIG. 3B are an example that is obtained through the above-indicated process, and the same constitute validation vector data expressing a chain of the validation vectors $\overrightarrow{Q_bQ_c}, \ldots, \overrightarrow{Q_fQ_g}$ shown in FIG. 8.

The classification process is conducted in a vector classification part 4 shown in FIG. 1A in parallel with the expression process in the vector expansion part 3.

C. Expansion into Cross Point Data

Within the respective enriched vector data, the validation vector data and the invalidation vector data are transmitted to a validation vector processing part 5a (FIGS. 1A, 1B) and an invalidation vector processing part 5b, respectively.

As shown in FIG. 1B, the validation vector processing part 5a has memories 7a and 8a which are alternately selected for read/write operations through a pair of bus switches 6a and 9a. The validation vector data are stored in a validation vector memory 10a through the paired buffer memories 7a and 8a. A validation point expansion part 11a reads out the validation vector data from the memory 10a to expand the validation vectors into cross points of the validation vectors and each scanning line. The expansion into the cross points may be carried out according to the technique disclosed in European Patent Publication No. EP-A2-0,200,885.

An example of the cross point data expressing each cross point is shown in FIG. 3C, where the cross point data $D_C$ has the main scanning coordinate value Y of the corresponding cross point (CP in FIG. 4, for example) and the attributive data AS obtained from the corresponding enriched vector data. Since the cross point data $D_C$ is generated on each scanning line having a known subscanning coordinate value, the subscanning coordinate value of the cross point may be omitted from the cross point data $D_C$. The cross point data obtained from validation vector data expresses a cross point of a scanning line and a front edge of the corresponding graphic figure, and therefore, the cross point data may be referred to as "front point data" or "validation point data" expressing "a validation cross point".

The invalidation vector processing part 5a further comprises memories 13a and 14a, which are alternately selected for read/write operations through a pair of bus switches 12a and 15a. The respective validation point data for the validation cross points are stored in one of the memories 13a and 14a which is selected for each scanning line, and then, the respective validation point data are read out from the same to be delivered to a raster-data generating part 100 (FIG. 1A) as data $D_{CA}$.

An invalidation vector processing part 5b has a structure similar to the validation vector processing part 5a, and the correspondence between them is indicated by replacing the suffix "a" of the reference numerals with "b". The invalidation vector processing part 5a expands the invalidation vector data into "invalidation point data" or "rear point data" $D_{CB}$, which expresses cross points ("invalidation cross points") of rear edge vectors and scanning lines, to deliver the data $D_{CB}$ to the raster-data generating part 100 for each scanning line. The "scanning lines" in the operation of the raster data generator 1 correspond to scanning lines defined in a scan of a photosensitive material for image reproduction, which will be described later, and data processing in the raster data generator 1 is conducted for each scanning line. The control of the raster data generator 1 is attained by means of a control part (not shown) operable to generate control signals synchronously with the scanning in the image reproduction.

Since the respective data processings in the vector processing parts 5a and 5b are pipe-line processings in which the respective, enriched vector data $D_Y$ are serially processed and expanded into the cross point data $D_{CA}$ ($D_{CB}$) to be serially delivered to the raster-data generating part 100, the efficiency of data processing in the raster data generator i is improved as compared with the case where the respective, enriched vector data for many vectors are converted into the cross point data through batch processing. Furthermore, since respective expansions of the validation vectors and the invalidation vectors are performed in parallel, the total speed in the expansion processing is further increased.

D. Process of Sorting Cross Point Data

Figure 9:
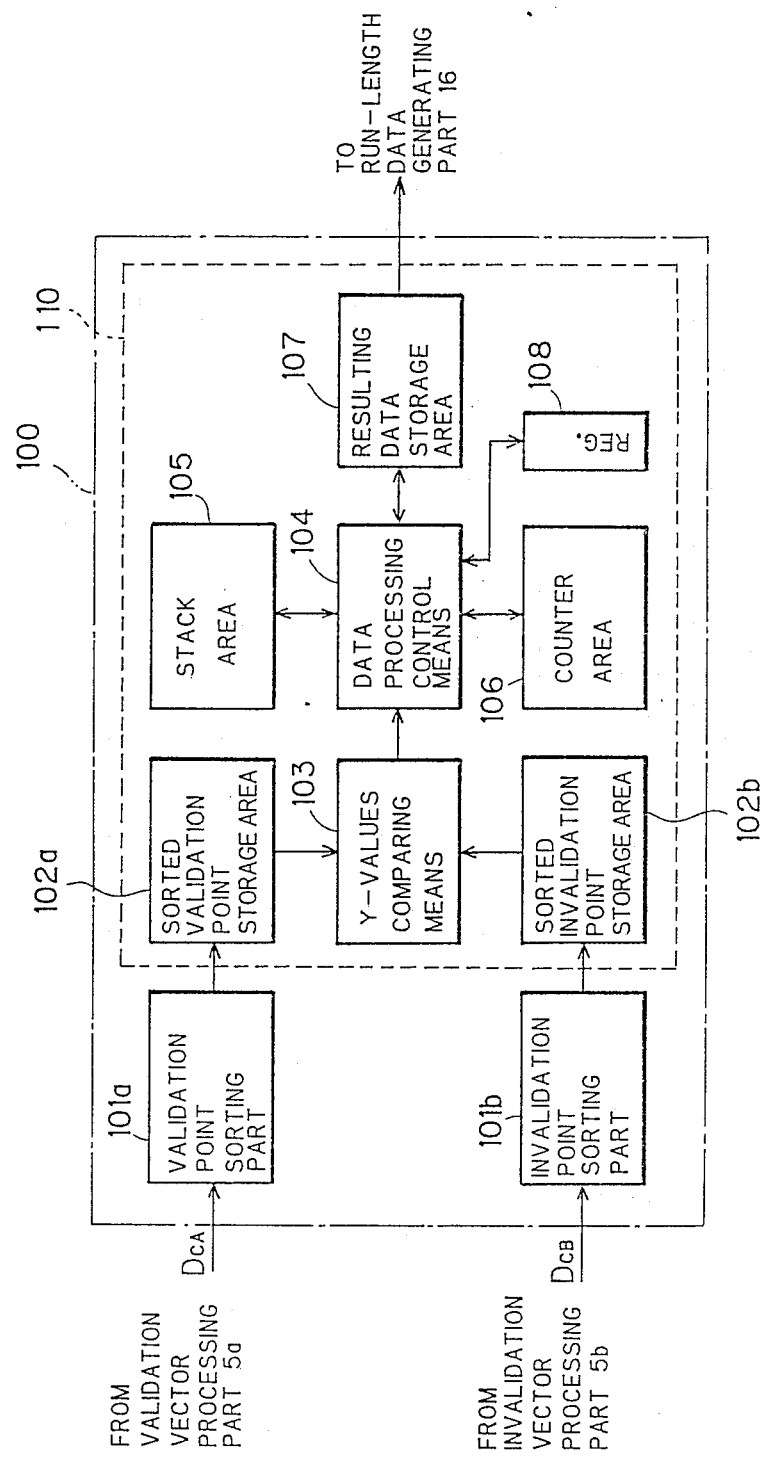
FIG. 9 is a block diagram of a raster-data generating part 100.

FIG. 9 is a block diagram showing the internal structure of the raster data generator 100. The validation point data $D_{CA}$ and the invalidation point data $D_{CB}$ are delivered to a validation point sorting part 101a and an invalidation point sorting part 101b, respectively. The validation point sorting part 101a is operable to sort or permute the validation point data $D_{CA}$ for each scanning line according to their respective main scanning coordinate values, which will be also referred to as "Y-values", to thereby generate a data chain for each scanning line in which the validation point data are arranged in a descending order of respective Y-values. Similarly, the invalidation point sorting part 101b is operable to sort or permute the invalidation point data $D_{CB}$ for each scanning line according to their respective Y-values, to thereby generate another data chain for each scanning line in which the invalidation point data are arranged in a descending order of respective Y-values.

Figure 10:
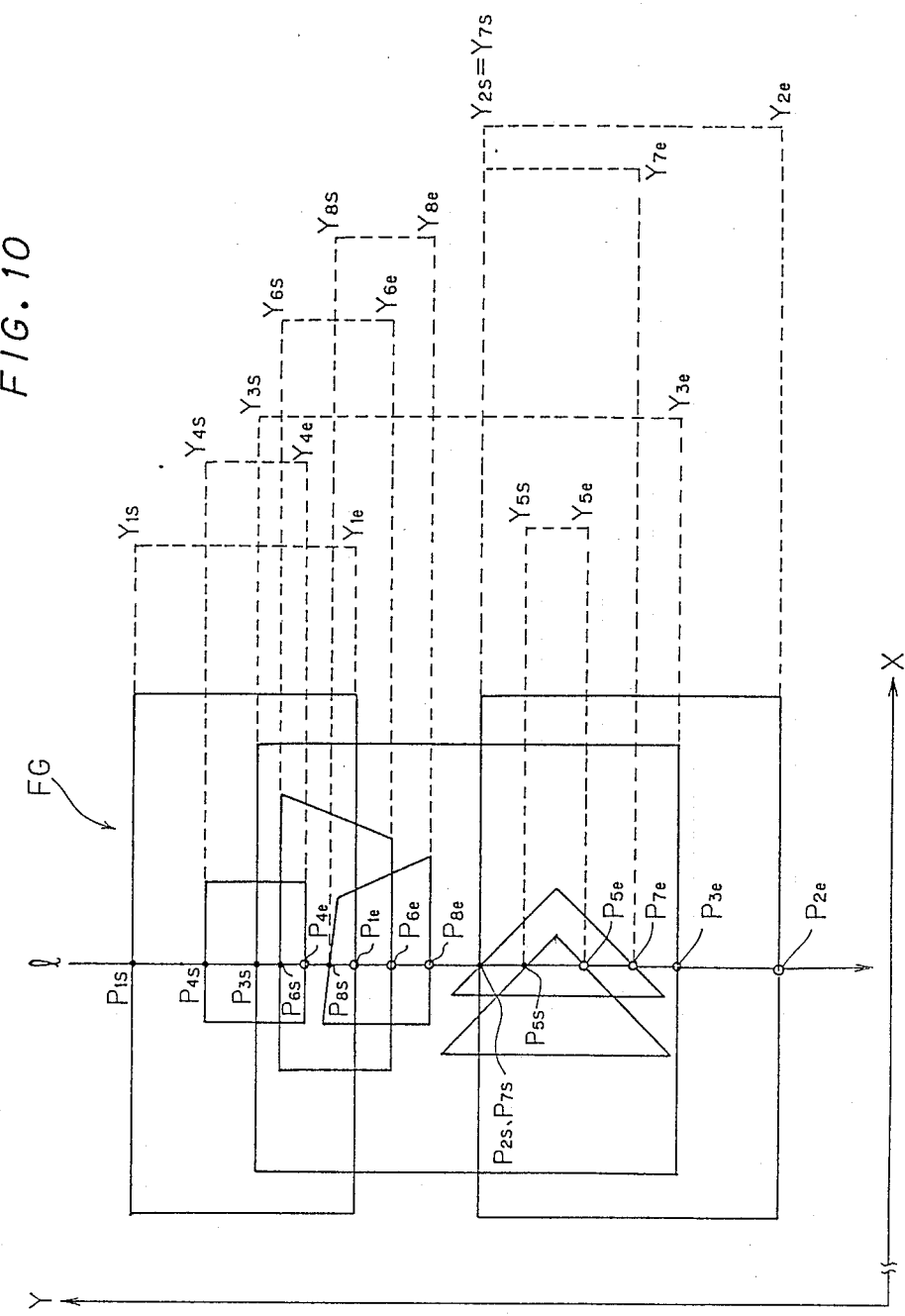
FIG. 10 shows respective orders of validation cross points and invalidation cross points.

FIG. 10 is an explanatory diagram showing the sorting process for the graphic figure group FG shown in FIG. 4. Validation points $P_{1s}$ through $P_{8s}$ and invalidation points $P_{1e}$ through $P_{8e}$ exist on the scanning line l, and they have Y-values $Y_{1s}$ through $Y_{8s}$ and $Y_{1e}$ through $Y_{8e}$, respectively. In FIG. 10, the respective ones of the validation points $P_{1s}$ through $P_{8s}$ are coupled with their corresponding ones of the invalidation points $P_{1s}$ through $P_{8s}$ by dotted lines in order to clarify the situation that the coupled two points ($P_{1s}$ and $P_{1e}$, for example) are obtained from the same graphic figure (LP1). Since the respective Y-values satisfy the inequalities:

$$Y_{1s} > Y_{4s} > \ldots > Y_{5e} \quad \ldots (1)$$

$$Y_{4e} > Y_{1e} > \ldots > Y_{2e} \quad \ldots (2)$$

the validation point data for the validation cross points $P_{1s}$ through $P_{8s}$ and the invalidation point data for the invalidation cross points $P_{1e}$ through $P_{8e}$ are sorted into the orders of (3) and (4), respectively, as follows:

$$P_{1s}, P_{4s}, \ldots, P_{5s} \quad \ldots (3)$$

$$P_{4e}, P_{1e}, \ldots, P_{2e} \quad \ldots (4)$$

The sorting process for the validation cross points and that for the invalidation cross points are performed in parallel, whereby the total speed of the sorting processes is increased.

When the respective halftone dot conditions or percentages for the graphic figures LP1 through LP8 shown in FIG. 4 are expressed as $T_1$ through $T_8$, the halftone dot percentages $T_1$ through $T_8$ are related to the values in the range from 0% to 100% as shown in FIG. 5. The respective priority grades of the graphic figures LP1 through LP8 are indicated in FIG. 6. Therefore, when the respective imaging priority data expressing the priority numerals "1" through "5" are represented by the symbols $P_1$ through $P_5$, respectively, the imaging priority data which is given to the graphic figure LP3, for example, is "$P_2$" according to the relationships shown in FIG. 5 and FIG. 6. Consequently, the imaging priority data $P_2$ and the halftone dot percentage $T_3$ are associated with each of the crossing points $P_{3s}$ and $P_{3e}$ (FIG. 10) obtained from the graphic figure LP3. Similarly, each of the other graphic figures is associated with an imaging priority data and a halftone dot percentage.

Figure 11:
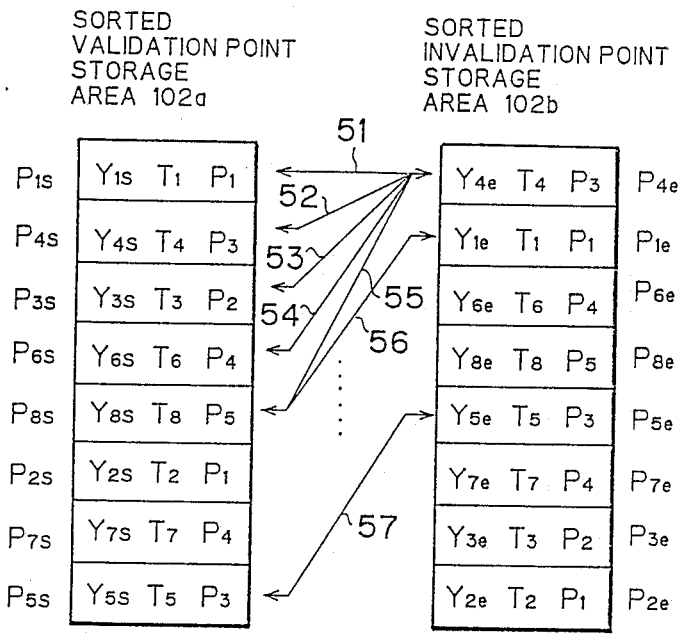
FIG. 11 is an explanatory diagram showing a process of comparing Y-values with each other.

In accordance with the sorting of the validation cross points $P_{1s}$ through $P_{8s}$, the respective validation point data are sorted or permuted, to be stored in a storage area 102a (FIG. 9) prepared for the sorted validation points. Similarly, the respective invalidation point data are sorted or permuted in accordance with the sorting of the invalidation cross points $P_{1e}$ through $P_{8e}$, and are stored in another storage area 102b prepared for the sorted invalidation points. FIG. 11 shows the state where the validation cross point data and the invalidation cross point data are stored in these storage areas 102a and 102b according to the orders of above-stated (3) and (4), respectively. Since each of the cross point data has the corresponding attributive data which is succeeded from the enriched vector data, the cross point data may be referred to as "enriched cross point data". In the preferred embodiment, functional blocks which are included in a block 110 (FIG. 9) are realized by software, i.e., a programmed computer. Therefore, the storage areas 102a, 102b and 105-107 correspond to storage areas in a memory (not shown) provided in the computer, and a Y-values comparing means 103 and a data processing means 104, which will be described later, are functional means embodied by a CPU and a program in the computer.

E. Process of Generating Raster Data

(F-1) Summary of the Process

Then, the validation point data $D_{CA}$ and the invalidation point data $D_{CB}$ are combined with each other to generate raster data that is used for reproducing the graphic figures through raster scanning. In this process, the cross point data $D_{CA}$ and $D_{CB}$ are referred to in a descending order of respective Y-values included therein, and the raster data is generated according to an imaging condition associated with a graphic figure having the highest priority grade within respective priority grades included in the cross point data which are being referred to and have not been used for generating the raster data yet.

(F-2) Structure and Illustration Forms in the Drawings

In order to perform the process, which will be described later with reference to FIGS. 12-14, the raster-data generating point 100 (FIG. 9) is provided with a stack area 105, a counter area 106, a register 108 and a resulting data storage area 107.

Within those areas, the stack area 105 serves as a storage area in which the attributive data are registered according to a rule described later. The number of the attributive data which are registered in the stack area 105 are counted for each of the priority grades "1" through "5" by means of the counter area 106. Data in the register 108 indicates a priority grade belonging to the attributive data which was used for having generated a component of the resulting data or raster data that was generated at the latest amongst components having been obtained. FIG. 15 shows the contents of these areas at each process stage t. In FIG. 15, symbol "RG" indicate the register 108, and another symbol "$P_{MAX}$" indicates a priority grade that is currently registered in the register 108. The reason why the suffix "MAX" exists in the symbol "$P_{MAX}$" is that the resulting data is generated using attributive data that has a maximum priority grade within attributive data currently registered in the stack area 105. The priority grade $P_{MAX}$ will be referred to as "a maximum priority grade". Furthermore, the respective columns in FIG. 15 that are indicated in the section of "counter 106" with the priority grades $P_1$ through $P_5$ show how many cross point data having each priority grade are currently registered in the stack area 105.

A registered total number M indicates the total number of the attributive data which are currently registered in the stack area 105. Data D that are obtained as the resulting data are the raster data used for generating a run-length data, and the same is stored in the resulting data storage area 107 in FIG. 9. The respective process stages $t = t_0, t_1, \ldots, t_{16}$ in FIG. 15 correspond to respective stages or timings in the process of generating the raster data, and from a spatial point of view, they are process stages serially appearing as a scan of the sorted cross point data progressing along a scanning line in the direction $(-Y)$.

Figure 16:
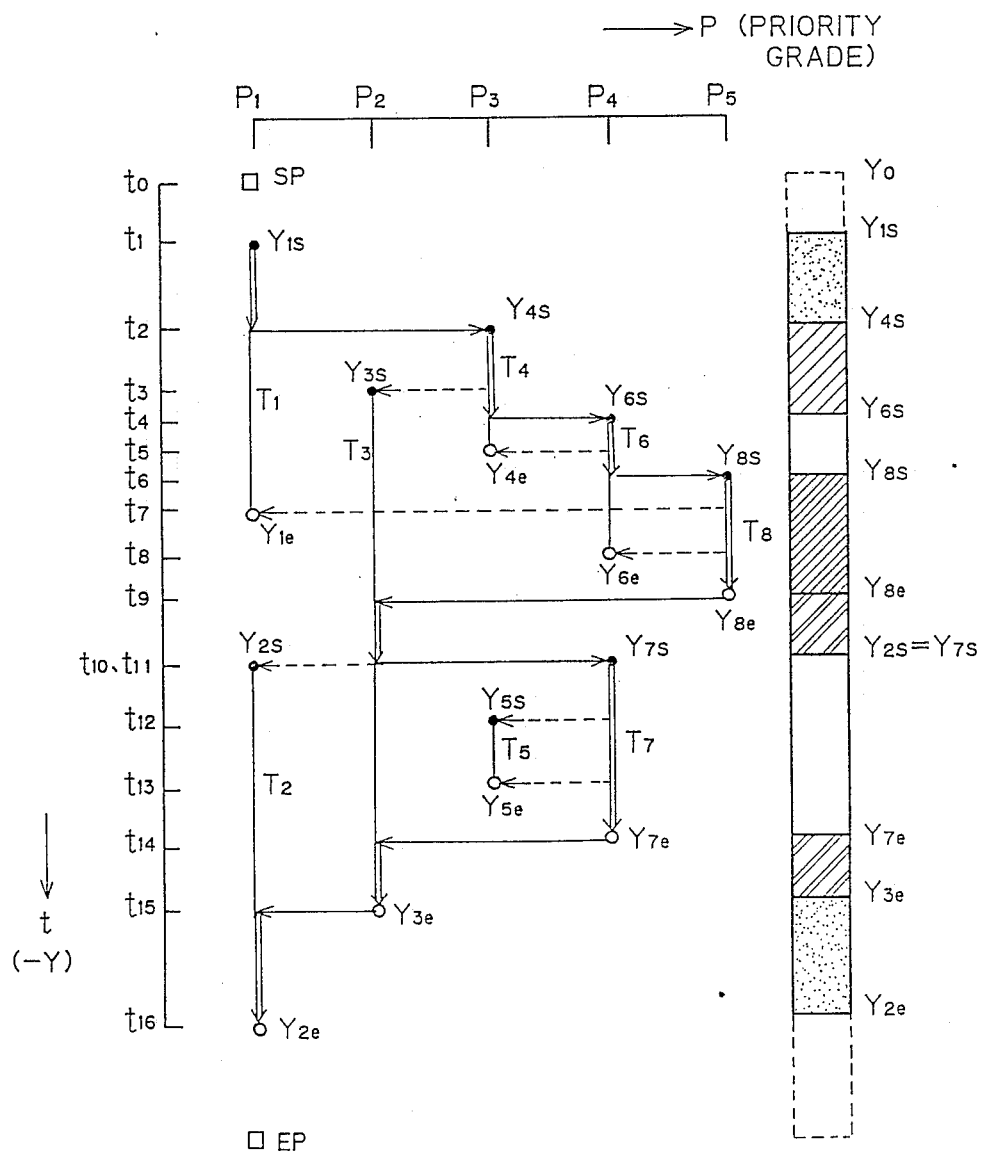

Further, FIG. 16 is provided in order to show the attributive data which are registered in the stack area 105 at respective time points or stages for each of the priority grades $P_1$ through $P_5$, where the reference symbols SP and EP indicate a starting and ending time of a main scanning, respectively. White, fat arrows in FIG. 16 show periods in which the resulting raster data are obtained from corresponding attributive data. Dotted arrows indicate when the attributive data other than those used for generating components of the resulting raster data are registered in or deleted from the stack area 105.

(F-3) Data Comparison for Registration

Details of the process using the above-indicated structure are as follows. First, the stack area 105, the counter area 106 and others are cleared, whereby the raster data generator 100 is initialized (the process step S1 in FIG. 12A). In the next process step S2, a maximum Y-value is extracted from the Y-values in the validation point data which are being stored in the validation point storage area 102a and have not been processed for generating the raster data. When the extracted maximum Y-value is written as "$Y_A$", the maximum Y-value $Y_A$ at this time is $Y_{1s}$ as understood from FIG. 11. Similarly, a maximum value is extracted from the Y-values in the invalidation point data which are being stored in the invalidation point storage area 102b and have not been used for generating the raster data; the extracted maximum Y-value being written as "$Y_B$". In the example of FIG. 11, the maximum Y-value at this time is $Y_{4e}$. A Y-value comparing means 103 in FIG. 9 compares the maximum Y-values $Y_A$ and $Y_B$ with each other in the process step S3.

Figure 12B:
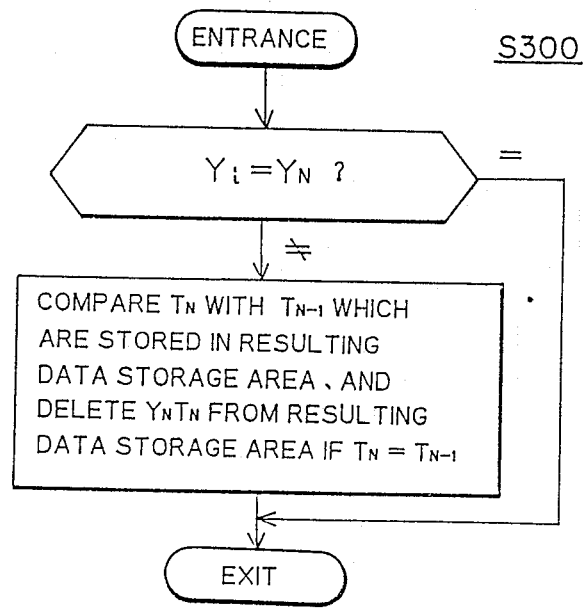
FIGS. 12A-12B, 13 and 14A-14B are flowchart showing a process of generating raster data.

When the condition $Y_A > Y_B$ is satisfied, i.e., when the maximum Y-value $Y_A$ in the validation cross points is larger than the maximum Y-value $Y_B$ in the invalidation cross points, the process is forwarded to the process step S300. The process step S300 is provided in order to detect the state where the same halftone dot percentage or "T value" is being registered in the resulting data storing area 107 two times in succession, and to delete one of them. Details of the process step S300 are shown in FIG. 12B, and the process step S300 is meaningful when the following process steps S100 and/or S200 are repeated two or more times. After passing through the process step S300, data processing is performed in the process step S100 on the basis of a validation point data $(Y_i, T_j, P_k)$ to which the extracted maximum Y-value a prior coordinate value) $Y_A$ belongs. In the example shown in FIG. 11, the cross point data for the validation cross point $P_{1s}$ is employed in the process step S100 at the first execution thereof, i.e., $$(Y_i, T_j, P_k) = (Y_{1s}, T_1, P_1)$$

Figure 13:
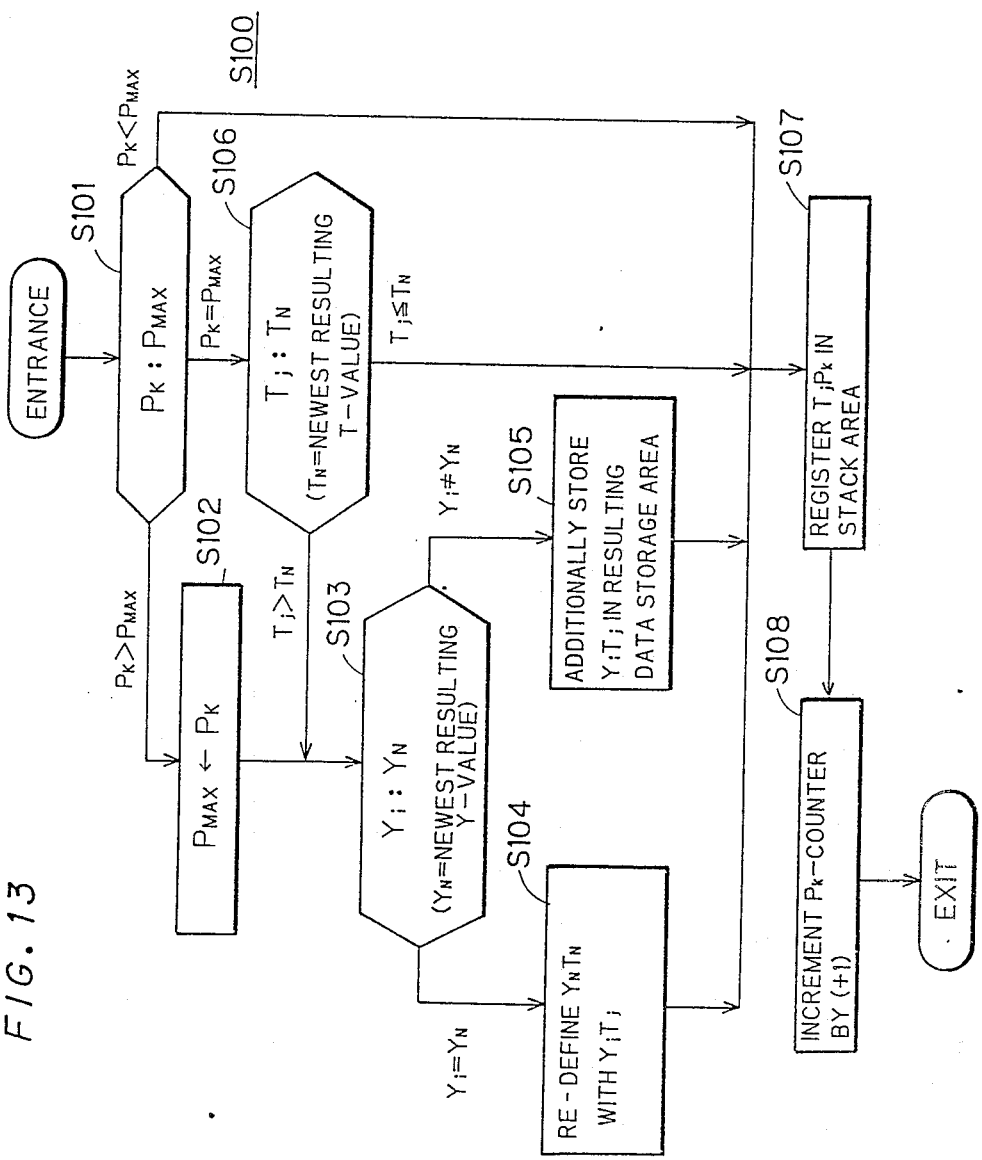

Details of the process step S100, are shown in FIG. 13, in which the maximum priority grade $P_{MAX}$ is compared with the value $P_k$ (the process step S101).

In the case where an initial value of the maximum priority grade $P_{MAX}$ is set at $(-1)$ and the respective data value of the priority grades $P_1$ through $P_5$ are "1" through "5", respectively, the condition $P_{MAX} < P_k$ is always satisfied with respect to a cross point that is extracted first. Consequently, the process is forwarded to the next process step S102, in which the value of the maximum priority grade $P_{MAX}$ is forced into the value of $P_k$. With respect to the validation point $P_{1s}$ in FIG. 11, for example, the value $P_k$ is $P_1$ and the maximum priority grade $P_{MAX}$ becomes $P_{MAX} = P_1 (= 1)$. This is also indicated in the row of $t = t_1$ in FIG. 15.

Next, the Y-value $Y_N$ included in the raster data which was brought into the resulting data storage area 107 at the latest up to the current time is extracted from the data D being registered in the area 107; and the Y-value $Y_N$ is compared with the Y-value $Y_i$ being processed (the process step S103). If $Y_i = Y_N$; i.e., the cross point being processed has the same Y-value as the newest component having been brought into resulting data, and the priority grade of the former is higher than that of the latter due to the branching condition at the process step S101; the values $Y_N$ and $T_N$ in the newest resulting data are forced into the values $T_i$ and $T_j$ in the process step S104, respectively. If the equality $Y_i = Y_N$ is not satisfied, the values $Y_i$ and $T_j$ are stored in the resulting data storage are 107 (the process step S105). Then, the attributive data $T_j$ and $P_k$ are registered in the stack area 105 the process step S107), and the value in a $P_k$-counter within the counter area 106 is incremented by $(+1)$ in the process step S108.

With respect to the validation cross point $P_{1s}$ in FIG. 11, for example, the values of $Y_{1s}$ and $T_1$ are stored in the resulting data storage area 107 since $Y_1 \neq Y_0$, under the condition that a Y-value $Y_0$ and a halftone dot percentage $T_0 = 0\%$ for the starting point SP of a main scanning are previously stored in the storage area 107.

As long as there remain one or more cross points which have not been processed yet, the process returns to the process steps S2 through the process step S4 after the execution of the process step S100. Therefore, when the above-indicated process is applied to the data shown in FIG. 11, the process is embodied as follows:

In the first execution of the process, a comparing step 51 shown in FIG. 11 is conducted and the attributive data $T_1$ and $P_1$ for the validation cross point $P_{1s}$ are registered in the stack area 105, as has been described above, whereby the data $Y_{1s}$ and $T_1$ are obtained as the first component of the resulting data. In the second execution of the process, a next comparing step 52 shown in FIG. 11 is conducted. Since the condition $Y_{4s} > Y_{4e}$ is satisfied as understood from FIG. 10, the data for the validation cross point $P_{4s}$ are registered in the areas 105 and 107 (see the row of $t = t_2$ in FIG. 15). Since the maximum priority grade $P_{MAX}$ is forced into $P_1 (= 1)$ at the stage $t = t_1$ and the priority grade $P_3 = (-3)$ of the validation cross point is higher than the current maximum priority grade $P_{MAX}$, the data $Y_{4s}$ and $T_4$ for the validation cross point $P_{4s}$ are also stored in the resulting data storage area 107.

In the third execution, a comparing step 53 in FIG. 11 is conducted. Similarly to the first and second executions, the data for the validation cross point $P_{3s}$ rather than that for the invalidation cross point $P_{4e}$ is employed, since the Y-value $Y_{3s}$ of the point $P_{3S}$ is larger than the Y-value $Y_{3e}$ of the point $P_{3e}$. However, the priority grade of the validation cross point is $P_2$ (=2), and it is lower than the maximum priority grade $P_{MAX}$ which was updated when the newest resulting data $Y_{4s}$ and $T_4$ were generated. Accordingly, the process jumps from the process step S101 to the process step S107. In order words, although the attributive data $T_3$ and $P_2$ are additionaly stored in the stack area 105, the same is not reflected to the resulting data D at this time.

In summary, during the validation, cross points are successively extracted and registered, and the respective attributive data for the validation cross points are added to the resulting data only if the respective priority grades of the extracted validation cross points are higher than the current maximum of the respective priority grades in the attributive data being registered in the stack area 105. This character of the process will be also understood from the white, fat arrows that are indicated in the period from $t=t_1$ to $t=t_4$ (or the period of $Y_{1s} \leq Y \leq Y_{6s}$) in FIG. 16. The process step S106 is provided for processing the attributive data in the case where neighboring two or more cross points exist on the same priority layer FIG. 6), and it will be described later as an "intra-layer processing".

(E-4) Data Comparison for Deletion

After the comparing step 51 in FIG. 11 is conducted to register the attributive data of the validation cross point $P_{6s}$, the respective Y-values of the validation cross point $P_{8s}$ and the invalidation cross point $P_{4e}$ are compared with each other according to the comparing step 55. As seen in FIG. 10, the respective Y-values $Y_{8s}$ and $Y_{4e}$ satisfy the condition $Y_{8s} < Y_{4e}$. Consequently, the process is forwarded from the process step S3 to the process step S200 in FIG. 12A through the process step S300, whereby data processing is performed on the basis of the invalidation point data ($Y_{4e}$, $T_4$, $P_3$) for the invalidation cross point $P_{4e}$.

Figure 14A:
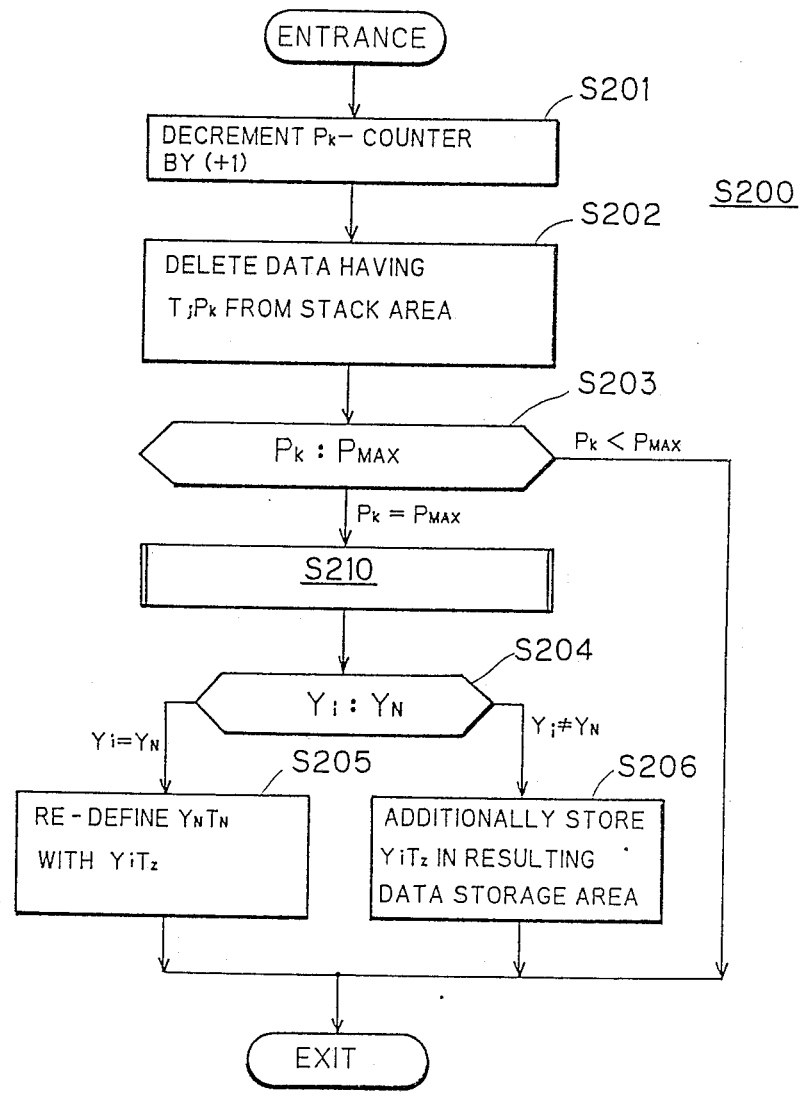
Figure 14B:
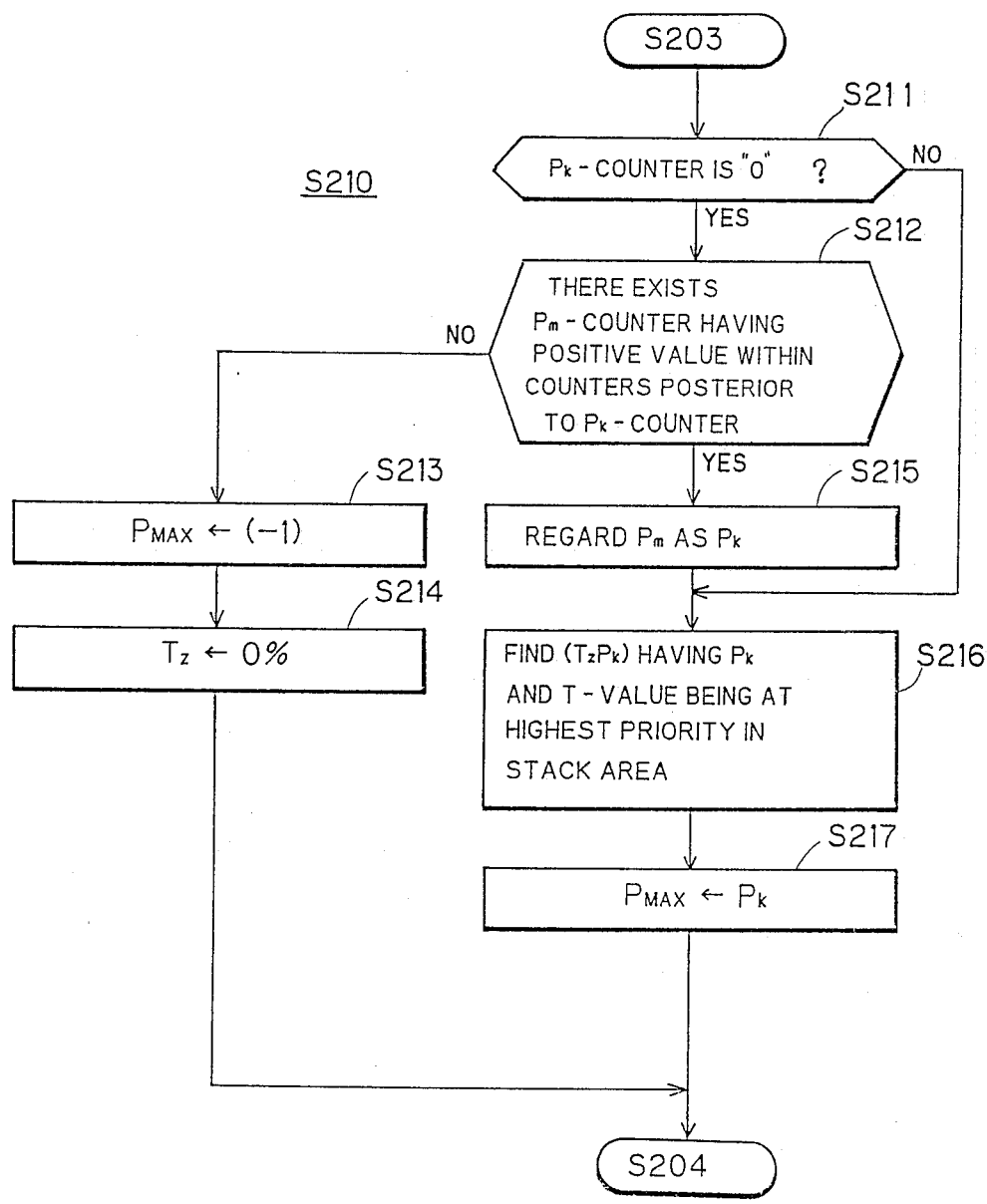

Details of the process step S200 are shown in FIG. 14A and FIG. 14B. In the process step S201, decremented by (+1) is the $P_k$-counter included in the counter area 106, which is the $P_3$-counter in the current stage, whereby it is indicated that the number of the attributive data having the priority grade $P_3$ within those being currently registered in the stack area 105. In the next process step S202, the attributive data identical to the attributive data $T_4$ and $P_3$ of the invalidation cross point $P_{4e}$ are deleted from the stack area 105. Through the process step S202, the attributive data $T_4$ and $P_3$ which have been registered in the stack area 105 from the process stage $t_2$ in FIG. 15 are deleted from the area 105 at the process stage $t_5$. In other words, the attributive data of the validation cross point $P_{4s}$ are conserved in the stack area 105 until the process reaches the invalidation cross point $P_{4e}$ which is obtained for the same graphic figure with the validation cross point $P_{4s}$; and when it reaches the invalidation cross point $P_{4e}$, the attributive data are deleted from the area 105. The cross mark "x" in the FIG. 15 shows deletion of data from the stack area 105.

In the next process step S203, the priority grade $P_k$ which is included in the attributive data having been deleted in the process step S202 is compared with the maximum priority grade $P_{MAX}$ stored in the register 108. For the comparing step, the value of the priority grade $P_k$ has been memorized so that it can be referred to even after it is deleted from the area 105. The maximum priority grade $P_{MAX}$ is "4" until the process reaches the process stage $t_5$ in FIG. 15, and the current maximum priority grade $P_{MAX}$ is higher than the deleted priority grade $P_3$. Therefore, it is recognized that other attributive data having a priority grade higher than $P_2$ remains in the stack area 105 after the attributive data having the priority grade data $P_3$ is deleted.

According to the rule where the raster data is generated on the basis of the attributive data having a maximum priority grade within those being stored in the stack area 105, the invalidation cross point $P_{4e}$ is not employed as a raster boundary point; this being due to an attributive data having the previous maximum priority grade remains in the stack area 105 even after the priority grade data $P_3$ is deleted. Accordingly, when the condition $P_k < P_{MAX}$ is confirmed in the process step S203 in FIG. 14, the process using the invalidation cross point $P_{4e}$ is completed without passing through the process steps S204 through S206.

Then the comparing step 56 in FIG. 11 is conducted, whereby the maximum Y-values $Y_{8s}$ within the validation point data having not been processed is detected to be compared with the maximum Y-value $Y_{1e}$ in the invalidation point data having not been processed. Since the condition $Y_{8s} > Y_{1e}$ is satisfied as seen from FIG. 10, the process using the attributive data of the validation cross point $P_{8s}$ is conducted according to the routine shown in FIG. 12A.

Suppose that the above-indicated process is repeated whereby the process reaches the invalidation cross point $P_{8e}$. At this stage, it is found that the priority grade $P_5$ (=5) is included in the attributive data $T_8$ and $P_5$ which is to be deleted, and the priority grade $P_5$ is identical to the maximum priority grade $P_{MAX}$ (=$P_5$) just prior to the process reaching the process stage $t_9$ in FIG. 15. Therefore, the attributive data $T_8$ and $P_5$ are those having the maximum priority, and there is a possibility that the value of the maximum priority grade would be changed if the attributive data $T_8$ and $P_5$ are deleted from the stack area 105.

Accordingly, when it is found in the process step S203 that $P_k = P_{MAX}$, the process is forwarded to the process step S210 (FIG. 14B) to judge whether or not the value in the $P_k$-counter is "0" (the process step S211). If the value in the $P_k$-counter is "0", it is recognized that the attributive data having the previous maximum priority grade $P_{MAX}$ (=$P_k$) does not remain in the stack area 105. Then, it is further judged whether or not there is counter $P_m$ having a positive value within the counters $P_1$ through $P_{k-1}$ whose respective priority grades are lower than the priority grade $P_k$ (the process step S212).

If such a counter $P_m$ is found, it is recognized that one or more attributive data having respective priority grades lower than the priority grade $P_k$ are remaining in the stack area 105. In this case, the priority grade $P_m$ is regarded as a priority grade $P_k$ of an attributive data which is to be subjected to the following process (the process step S215). If there are two or more values of $P_m$ satisfying the condition $m < k$, the maximum value within them is employed as a new value of $P_k$. For example, when the attributive data $T_8$ and $P_5$ which are identical to those of the invalidation point $P_{8e}$ are deleted from the stack area 105 in the process stage $t=t_9$ in FIG. 15, the priority grade $P_2$ is found as the priority grade $P_m$. Consequently, the priority grade $P_2$ is employed as the new priority grade $P_k$ in this case.

In the next process step S216, attribute data which have the same priority grade with the new value of $P_k$ and a halftone dot percentage (thereinafter referred to as a "T-value") having a maximum priority grade is extracted from the attribute data being stored in the stack area 105. The extracted attributive data are hereinafter written as $(T_z, P_k)$, where the T-value $T_z$ is that having the maximum priority grade within the stack area 105. A priority rule of T-values within each priority layer (i.e., an intra-layer priority rule) is previously determined, and it may be common to the respective priority layers, or alternately, different rules may be prepared for the priority layers. The intra-layer priority rule may be the rule that a larger T-value is prior to a smaller T-value.

In the example at $t=t_9$ in FIG. 15, the extracted attributive data are $T_z=T_3$ and $P_k=P_2$, since there is only one attribute data having the priority grade $P_2$. Then, in the process step S217, the value of the maximum priority grade $P_{MAX}$ is re-defined by the value of $P_k$ ($=P_2$). On the other hand, when a counter which has a positive value is not found in the process step S212, it is recognized that no attributive data are remaining in the stack area 105, and therefore, the value of the maximum priority grade $P_{MAX}$ is initialized again to ($-1$) in the process step S213, and the value of $T_z$ is set at 0% in the process step S214.

The process steps S204 through S206 correspond to the process steps S103 through S105 in FIG. 13, respectively. Accordingly, the newest component of the resulting data D is rewritten, or alternatively, the next Y-value and T-value are added to the resulting data in the resulting data storage area 107 through the process steps S204 to S206, where the attributive data which are used in the process steps S205 and S206 are $Y_i$ and $T_z$.

The deletion process will be now described from another point of view with reference to FIG. 16. In the process stage $t=t_9$, the invalidation cross point $Y_{8e}$ is subjected to the current process; and the attributive data of the validation cross point $Y_{8e}$, which is obtained from the same graphic figure $LP_8$ with the invalidation cross point $Y_{8e}$, are deleted from the stack area 105. Just after the deletion, extracted is the attributive data of the validation cross point $Y_{3s}$ which has a maximum priority grade within the attributive data remaining in the stack area 105. Then, on the basis of the extracted attributive data of the validation cross point $Y_{3s}$, the newest raster condition in the resulting data D changes from $T=T_8$ to $T=T_3$.

The attributive data of the validation cross point is not reflected to the resulting data D at the process stage $t=t_3$ here the same is registered in the stack area 105. However, after all of the attributive data having a priority grade higher than the priority grade $P_2$ of the validation cross point $Y_{3s}$ are deleted from the stack area 105, the priority grade $P_2$ is a maximum priority grade within the priority grades being registered in the stack area 105. Consequently, attributive data having the priority grade $P_2$ are employed for generating a new component of the resulting data D.

That is, since attributive data which are hidden behind other attributive data having higher priority grades in early stages are conserved in the stack are 105, the same contributes toward generating a component of the raster data in a later stage after the attributive data having higher priority grades are deleted.

By repeating the above-indicated process, respective attributive data are serially registered in and deleted from the stack area 105 while storing respective components of the resulting data D in the resulting data storage area 102, as shown in FIGS. 15 and 16. The step of registering the attributive data $T_2$ and $P_1$ at the process stage $t=t_{10}$ and that of generating the attributive data $T_7$ and $P_4$ may be performed in an arbitrary order thereof, since respective T-value $Y_{2s}$ and $Y_{7s}$ corresponding to them are identical with each other (i.e., $Y_{2s}=Y_{7s}$). This is the reason why the condition $t_{10}=t_{11}$ is indicated in FIG. 16.

As will be understood from FIG. 10, no validation cross point is additionally registered in the stack area 105 after the validation cross point $Y_{5s}$ is registered, and the process stages following the same are directed to the deletion of the invalidation cross points. That is, where is no cross point in the validation point storage area 102a that remains and that is not subjected to the process of registering the attribute data, after the comparing step 57 in FIG. 11 is completed. In this case, the contents of the process step S2 in FIG. 12 are interpreted as "extract one of the remaining cross points in the invalidation point storage area 102b according to a descending order of Y-values".

In summary, a new component is generated to be added to the resulting data D every time the maximum priority grade within the attributive data being currently registered in the stack area 105 is changed in response to an operation in which an attributive data is newly registered in or is deleted from the stack area 105. When all of the cross point data have been registered in and then deleted from the stack area 105, the process of generating the raster data for the current scanning line is completed and the process is forwarded to the next scanning line.

(E-5) Intra-layer Processing

In the example shown in FIGS. 15 and 16, two or more cross points having the same priority grade do not lie adjacent each other on a scanning line. However, as shown in FIG. 17, sometimes caused is the situation where a plurality of graphic figures LPA and LPB having the same priority grade $P_2$, for example, overlap each other, and Y-values $Y_{as}$, $Y_{bs}$, $Y_{ae}$ and $Y_{be}$ having the same priority grade $P_3$ lie adjacent each other on the same scanning line l.

Also in such a case, each of the Y-values $Y_{as}$ and $Y_{bs}$ for the validation cross points and each of the Y-values $Y_{ae}$ and $Y_{be}$ for the invalidation cross points are serially extracted from the respective sets of the Y-values according to descending orders of the Y-values, and the extracted Y-values are compared with each other (the comparing steps 61 and 62 shown in FIG. 18). Though the comparison, the larger one is detected to be subjected to the raster data generating process (the process step S2 in FIG. 12A).

When the extracted Y-value of a validation cross point is larger than that of an invalidation cross point, the process is forwarded to the process step sequence S100 in FIG. 13. If the extracted Y-value for the validation cross point is $Y_{bs}$ in FIG. 17, the result of the judgement in the process step S101 is "$P_k=P_{MAX}$" as shown in the row $t=t_2$ in FIG. 19. Then, the T-value $T_b$ of the validation cross point which shall be newly registered in the resulting data storage area 107 is compared with a T-value $T_a$ of a validation cross point that has been registered in the resulting data storage area 107 in the process step S106. If the intra-layer priority rule is so determined that a graphic figure having a larger halftone dot percentage is prior to that having a smaller halftone dot percentage in the same priority layer, a correction of the resulting data D or an addition of a component to the resulting data D is performed in the process steps S103 through S105 only when the condition $T_a < T_b$ is satisfied. FIG. 19 shows an example in which the condition $T_a < T_b$ is satisfied, whereby the data $Y_{bs}$ and $T_b$ are added to the resulting data D as a new component thereof.

In the process of deleting attributive data from the stack area 105 in the case where a plurality of graphic figures overlap each other in the same priority layer, the result of the judgement in the process step S211 of FIG. 14B is "No". In fact, even if the attributive data $T_a$ and $P_3$ are deleted in the process stage $t = t_3$ of FIG. 19, the value in the $P_3$-counter is "1" rather than "0". Consequently, the process steps S212 and S213 are bypassed, and the data $T_z$ and $P_k$ are forced into the remaining attributive data $T_b$ and $P_3$ in the same priority layer, whereby the maximum priority grade $P_{MAX}$ remains at $P_3$.

Figure 12A:
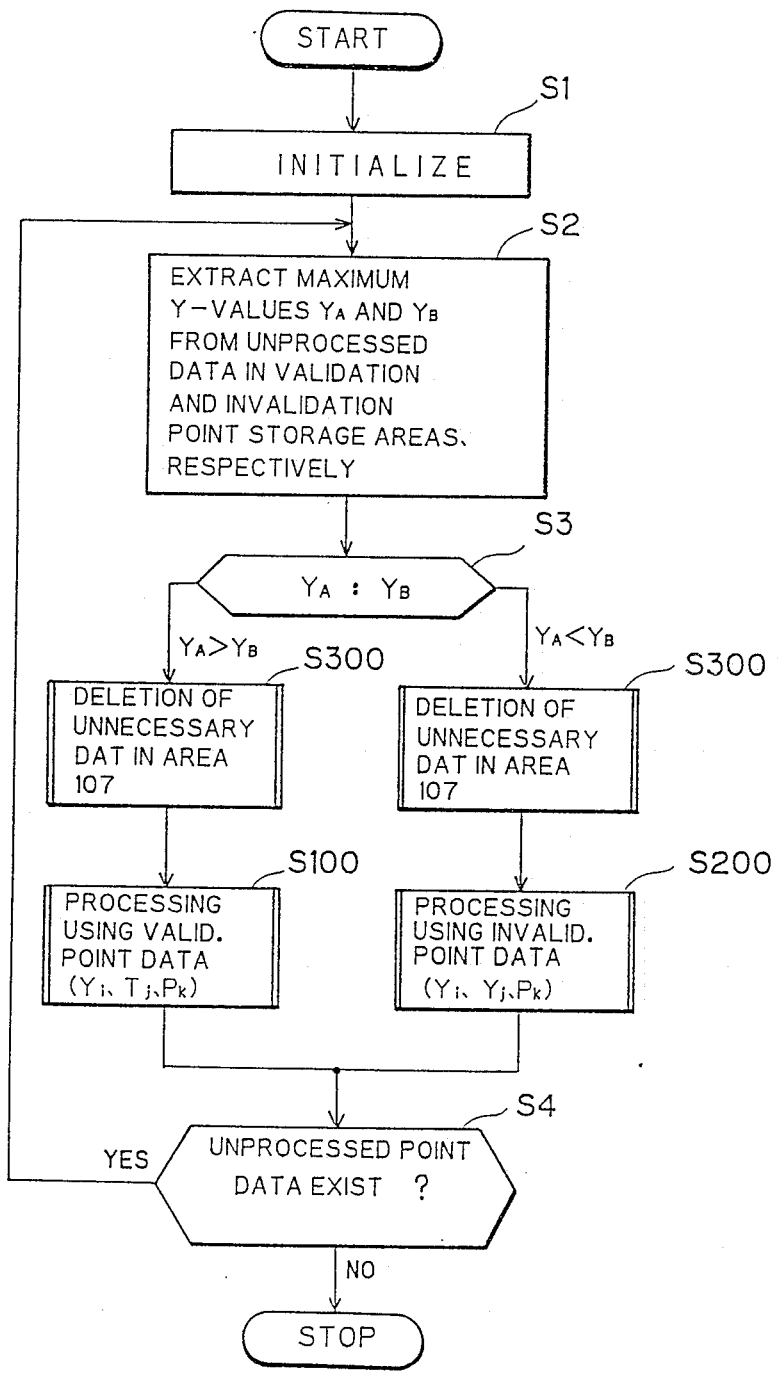

In the process stage $t = t_3$, the data $Y_{ae}$ and $T_b$ are stored in the resulting data storage area 107 through the process steps S204 and S206, and then, the data $Y_{ae}$ and $T_b$ are deleted in the process step S300 in FIG. 12A. As a result, components that are unnecessary for the raster data is deleted, whereby an amount of data in the resulting data storage area 107 is decreased.

Through the deletion of the data $Y_{ae}$ and $T_b$, the halftone dot percentage $T_b$ is substantially valid in the image reproduction until the main scanning reaches the Y-values $Y_{ae}$ which is included in the component ($Y_{ae}$, $T_b$) in the resulting data generated in the process stage $t = t_4$. Therefore, the resulting data or the raster data indicates that the inner region of the graphic figure LPB shown in FIG. 17 is to be filled with a tint having the halftone dot percentage $T_b$ at a higher priority than that of the other graphic figure $T_a$.

F. Process of Generating Run-length and Data Output

The above indicated process is conducted under the control of a process controlling means 104 shown in FIG. 9. When the process for a scanning line is completed, obtained is the state where the data D shown in column "Result D" in FIG. 15 is being stored in the resulting data storage area 107. If the intra-layer process is also performed, the resulting data in the storage area 107 contains the data shown in the column "Result D" in FIG. 19. Through repetition of the process of generating raster data for all of the scanning lines arrayed in the subscanning direction, the desired raster data for respective regions on an imaging plane are obtained.

The resulting data D is transmitted to a run-length data generating part 16 in FIG. 1 as the raster data for each scanning line. The run-length data generating part 16 generates run-length data $D_R$ (FIG. 3D) from respective component pairs of the data D, each of which consists of two components whose respective Y-values lie adjacent each other in the direction $(-Y)$. In the period between the two points which are indicated with the resulting data $Y_{6s}T_6$ and $Y_{8s}T_8$, respectively, for example, a component of the run-length data indicating a run-length $RL = Y_{6s} - Y_{8s}$ and a halftone dot percentage $T_6$ is generated. Since the spatial priority order of the graphic figures has been taken into consideration in the process of generating respective components of the raster data D, the raster data D may have only T-values and Y-values i.e., the imaging condition data CD, and it is unnecessary to give priority grade data P to the run-length data $D_R$.

The run-length data $D_R$ thus obtained for each scanning line is stored in a run-length memory 17 shown in FIG. 1. After the run length data $D_R$ for all scanning lines are stored in the run-length memory 17, the data $D_R$ are transferred to a halftone dot recorder 30. A recording drum 31 around which a photosensitive film 32 is wound is rotated in a direction $\theta$ for main scanning, and a recording head 33 is moved in a direction X synchronously with the rotation of the recording drum 31 for subscanning. An acoustic optical modulator which is provided in the recording head 33 is controlled according to the run-length data $D_R$, whereby a laser beam from the recording head 33 is modulated. The photosensitive film 32 is exposed to the modulated laser beam for each scanning line, and the image shown in FIG. 2 is reproduced on the photosensitive film 32 as a latent halftone dot image through a raster scan thereof. As is understood by comparing a produced image for one scanning line shown in the right side of FIG. 16 with a timing chart in the data processings shown in the center part of FIG. 16, graphic figures having higher priority grades are recorded spatially prior to those having lower priority grades. Therefore, the raster data generator according to the present invention are suitable for the production of a multitone image.

G. Modifications

In the preferred embodiment described above, the validation cross points and the invalidation cross points are serially processed in a descending order of their respective Y-values, since the main scanning coordinate axis Y is defined as antiparallel to the main scanning direction $(-Y)$. However, if the main scanning coordinate axis is defined in parallel to the direction Y, the cross points are serially processed in an ascending of their Y-values.

The multitone imaging condition may include the halftone dot percentage, a density value, gradation, a color and/or other values. Although it is preferred that the expansion of the validation vectors into validation cross points and the sorting thereof are conducted in parallel with those for invalidation vectors, they may be conducted in series.

The intra- and inter-layer processing may be performed independently, and in such a case, the enriched cross point data are subjected to the intra-layer processing before the inter layer processing, for example.

The respective contours of graphic figures may be expressed by segments having no directionality rather than vectors. "Front edge segments" and "rear edge segments" can be identified by adding to segment data expressing the segments flags for discriminating between them.

In order to understand the character of the present invention more clearly, consider the technique where respective graphic figures on the priority layers LR1 through LR5 in FIG. 6 are serially overlapped one by one. Although raster data can be also obtained through such technique, the process of serially overlapping the graphic figures becomes complicated. On the other hand, according to the present invention, all of the graphic figures in the respective priority layers can be processed and overlapped with each other through a single processing sequence, and therefore, it will be understood that the present invention is superior to the above-indicated technique.

In the present invention, since graphic figures are expanded into cross points of their contours and each scanning line, and raster data are generated according to the priority grades transferred from the graphic figures to the cross points, the graphic figures are systematically reproduced under multitone imaging conditions. The efficiency and the speed in generating the raster data are increased because the cross points are classified into two groups, and respective cross points which are sorted in the two groups are serially compared with each other. In particular, the parallel processing of the two groups is effective for further increasing the speed in generating the raster data.

Although the present invention has been described and illustrated in detail, it is clearly understood that the same is by way of illustration and example only and is not to be taken by way of limitation; the spirit and scope of the present invention being limited only by the terms of the appended claims.

We claim:

1. A method of generating raster data for use in producing a multitone image that includes graphic figures by a raster scan of an imaging plane for each scanning line, the method comprising the steps of:
   (A1) preparing sets of contour lines which express contours of said graphic figures, respectively;
   (A2) determining an image condition and a priority grade of each graphic figure for production of said multitone image;
   (A3) generating attributive data expressing said imaging condition and said priority grade for each graphic figure;
   (A4) relating said attributive data to each contour line belonging to said sets of contour lines for each graphic figure;
   (A5) classifying contour lines belonging to said sets of contour lines into first and second groups according to respective locations of said contour lines in said contours, where said first group consists of first contour lines which face an upstream side of a main scanning in said raster scan, and said second group consists of second contour lines which face a downstream side of said main scanning;
   (A6) obtaining first cross points of said first contour lines and a scanning line;
   (A7) for each first cross point, generating first cross point data which includes a main scanning coordinate value of the first cross point and said attributive data related to a contour line from which the first cross point is obtained;
   (A8) obtaining second cross points of said second contour lines and said scanning line;
   (A9) for each second cross point, generating second cross point data which includes a main scanning coordinate value of the second cross point and said attributive data related to a contour line from which the second cross point is obtained;
   (A10) comparing respective main scanning coordinate values of said first cross points with each other to serially extract a first object point from said first cross points along an order from said upstream side to said downstream side;
   (A11) comparing respective main scanning coordinates values of said second cross points with each other to serially extract a second object point from said second cross points along said order;
   (A12) comparing respective main scanning coordinate values of said first and second object points with each other to specify a cross point which is located at a position nearer to said upstream side within said first and second object points;
   (A13) selectively conducting the following steps (A13a) and (A13b);
   (A13a) when a specified cross point which is specified in the step (A12) is said first object point, registering said attributive data of said first object point in a first memory means;
   (A13b) when said specified cross point is said second object point, deleting attributive data which are identical to said attributive data of said second object point from said first memory means;
   (A14) detecting a change of a maximum priority grade within attributive data which are currently registered in said first memory means, said change being caused by the step (A13);
   (A15) in response to said change of said maximum priority grade, finding attributive data in said first memory means to which a changed maximum priority grade belongs;
   (A16) generating a component of said raster data on the basis of said imaging condition belonging to said attributive data which is found in the step (A15) and said main scanning coordinate value of said specified cross point;
   (A17) repeating the steps (A11) through (A16) until all of said first and second cross point are extracted in the step (A11) to generate components of said raster data for said scanning line; and
   (A18) repeating the steps (A6) through (A17) for each scanning line arrayed in a subscanning direction to generate said raster data.

2. The method of claim 1, wherein a combination of the steps (A6) and (A7) is conducted in parallel with a combination of the steps (A8) and (A9).

3. The method of claim 2, wherein:
   the step (A10) includes the steps of:
   (A101) sorting respective first cross point data for said first cross points according to respective main scanning coordinate values in said first cross point data to store sorted first cross point data in a second memory means; and
   (A102) serially reading out said stored first cross point data from said second memory means in an order along said scanning line to serially provide said first object point; and
   the step (A10) includes the steps of:
   (A111) sorting respective second cross point data for said second cross points according to respective main scanning coordinate values in said second cross point data to store sorted second cross point data in a third memory means; and
   (A112) serially reading out said sorted second cross point data from said third memory means in said order along said scanning line to serially provide said second object point.

4. The method of claim 3, further comprising the steps of:
   (A19) comparing a first main scanning coordinate value of said specified cross point with a second main scanning coordinate value in a component of said raster data which is obtained at the latest up to a current time;

(A20) in the case where said first and second scanning coordinate values are different from each other, comparing a first imaging condition for said specified cross point with a second imaging condition included in said component obtained latest; and (A21) in the case where said first and second imaging conditions are identical to each other, deleting said component obtained at the latest from said first memory means.

5. The method of claim 4, wherein same priority grade is commonly assigned to two or more grades figures.

6. The method of claim 5, wherein:
said priority grade is selected from first through M-th priority grades where M is an integer larger than one; and
a total number of said graphic figures is larger than the integer M.

7. The method of claim 6, further comprising the step of;

(A22) in the case where said specified cross point is said first object point, and said maximum priority grade is not changed by the step (A13a), comparing a third imaging condition of said specified cross point with a fourth imagining condition included in a component of said raster data which is generated at the latest up to a current time, to generate a new component of said raster data on the basis of said main scanning coordiante value of said specified cross point and said third imaging condition only when said third imaging condition is at a higher priority than said fourth imaging condition accroding to a predetermined priority rule of imaging conditions.

8. The method of claim 7, further comprising the step of:

(A23) in the case where said specified point is said second object point, and said maximum priority grade is not changed by the step (A13b), comparing said thrid imaging condition with a fifth imaging condition included in said attributive data which remains in said first memory means and has said maximum prioirty grade after the step (A13b) is completed, to generate a new component of said raster data on the basis of said main scanning coordinate value of said specified cross point and said fifth imaging condition only when said third imaging condition is at a higher priority than said fifth imaging condition according to said priority rule.

9. The method of claim 8, wherein: said method further comprises the step of:

(A24) preparing first through N-th counter means which are assigned to said first through N-th priority grades, respectively;

the step (A13a) includes the step of:

incrementing one of said first through N-th counter means corresponding to a priority grade of said specified cross point when said specified cross point is said first object point;

the step (A13b) includes the step of;

decrementing one of said first through N-th counter means corresponding to said priority grade of said specified cross point when said specified cross point is said second object point; and the step (A14) includes the step of:

referring to said first through N-th counter means to find said change of said maximum priority grade.

10. A method of claim 9, wherein:
said contour lines are contour vectors whose directionality are so determined that an internal region of a graphic figure exists on one side of each contour vector; and the step (A5) includes the steps of:

detecting respective directions of said contour vectors; and classifying said contour vectors into said first and second groups according to said directions.

11. The method of claim 10, wherein:
each of said contour vectors is expressed by a vector data having respective coordinate values of terminal points of the contour vector;

the step (A4) includes the step of adding said attributive data to corresponding vector data; and said contour lines which are classified in the step (A5) are expressed by said vector data accompanied with said attributive data.

12. The method of claim 11, wherein a plurality of contour vectors which belong to the same group within said first and second groups and are connected in series on a contour of a graphic figure are combined with each other in said vector data.

13. The method of claim 12, wherein said priority grade is provided to each graphic figure regardless of respective imaging conditions of said graphic figures.

* * * * *